US008514551B2

(12) United States Patent
Cosley et al.

(10) Patent No.: US 8,514,551 B2
(45) Date of Patent: Aug. 20, 2013

(54) PANELBOARD ENCLOSURE WITH EXTERNAL POWER CUTOFF SWITCH

(75) Inventors: Michael R. Cosley, Crystal Lake, IL (US); Garrett Matheron, Falconer, NY (US); Alan Amoroso, Buffalo, NY (US)

(73) Assignee: Diversified Control, Inc., Orchard Park, NY (US)

( * ) Notice: Subject to any disclaimer, the term of this patent is extended or adjusted under 35 U.S.C. 154(b) by 147 days.

(21) Appl. No.: 12/817,594

(22) Filed: Jun. 17, 2010

(65) Prior Publication Data

US 2011/0310533 A1 Dec. 22, 2011

(51) Int. Cl.
*H02B 11/133* (2006.01)
*H05K 5/02* (2006.01)
*H01H 9/20* (2006.01)

(52) U.S. Cl.
USPC ........... 361/632; 361/631; 361/634; 361/635; 361/643; 361/616; 200/50.32; 200/50.33; 200/50.4

(58) Field of Classification Search
USPC ................ 361/631, 632, 634, 635, 643, 616; 200/50.32, 50.33, 50.4
See application file for complete search history.

(56) References Cited

U.S. PATENT DOCUMENTS 3,778,633 A 12/1973 DeVisser et al.
4,270,031 A * 5/1981 Borona et al. ............ 200/50.33
5,136,463 A 8/1992 Webster
5,286,935 A 2/1994 Mina et al.
5,288,958 A 2/1994 Grunert et al.
5,319,168 A 6/1994 Hutko et al.
5,393,942 A 2/1995 Reiner et al.
5,577,603 A 11/1996 Bogdanovs et al.
5,648,646 A * 7/1997 Flegel ....................... 200/50.32
5,670,936 A 9/1997 Estes et al.
5,781,410 A 7/1998 Keown et al.
5,963,420 A * 10/1999 Bailey et al. ................. 361/616
5,977,492 A * 11/1999 Taylor et al. .............. 200/50.32
5,982,652 A 11/1999 Simonelli et al.
6,031,193 A * 2/2000 Flegel ....................... 200/50.33
6,069,328 A * 5/2000 Oravetz et al. ............ 200/50.33
6,184,595 B1 * 2/2001 Flegel, Jr. .................... 307/114
6,521,849 B1 * 2/2003 Flegel ....................... 200/50.32
6,534,735 B1 * 3/2003 Czarnecki ..................... 200/333
6,541,718 B2 * 4/2003 Burkholder et al. ....... 200/50.28
6,570,269 B2 5/2003 McMillan et al.
6,621,689 B1 * 9/2003 Flegel .......................... 361/631
6,784,385 B2 8/2004 Hernandez-Perez (Continued)

OTHER PUBLICATIONS

Electric Equipment & Engineering Co., “200A, 120/240V, 1 Phase TSM With TWS Surge Protection and GFI in 3R Cabinet”, Apr. 6, 2009, 1 page.

(Continued)

*Primary Examiner* — Anatoly Vortman
(74) *Attorney, Agent, or Firm* — Walter W. Duft

(57) ABSTRACT

An electrical panelboard enclosure includes a primary service panel configured to receive power from a main power source and an alternate power source, an alternate power source connector array, and a distribution panel that delivers main or alternate power to subsidiary load circuits. A service transfer switch unit includes a main power breaker and an alternate power breaker having mutually interlocked toggle switches for respectively activating/deactivating the main and alternate power. The panelboard enclosure further includes a power cutoff switch operable from outside a service entrance door of the enclosure to mechanically engage and deactivate the main power breaker toggle switch.

9 Claims, 19 Drawing Sheets

From main power source
From alternative power source

(56) References Cited

U.S. PATENT DOCUMENTS

| | | | | |
|---|---|---|---|---|
| 6,927,349 | B1 * | 8/2005 | Flegel et al. | 200/50.32 |
| 6,932,443 | B1 | 8/2005 | Kaplan et al. | |
| 6,980,725 | B1 | 12/2005 | Swieconek | |
| 7,142,950 | B2 | 11/2006 | Rasmussen et al. | |
| 7,238,898 | B1 * | 7/2007 | Czarnecki | 200/50.32 |
| 7,239,045 | B2 | 7/2007 | Lathrop et al. | |
| 7,259,481 | B2 | 8/2007 | Eaton et al. | |
| 7,268,308 | B1 * | 9/2007 | Caudill et al. | 200/50.35 |
| 7,339,353 | B1 | 3/2008 | Masias et al. | |
| 7,402,766 | B1 * | 7/2008 | Jonas et al. | 200/50.33 |
| 7,418,314 | B2 | 8/2008 | Rasmussen et al. | |
| 7,446,270 | B2 * | 11/2008 | Somalingayya et al. | 200/50.32 |
| 7,462,791 | B1 * | 12/2008 | Flegel | 200/50.32 |
| 7,514,815 | B2 | 4/2009 | Paik et al. | |
| 7,531,762 | B2 * | 5/2009 | Flegel | 200/50.32 |
| 7,599,171 | B1 | 10/2009 | Remmert | |
| 7,616,432 | B2 * | 11/2009 | Luebke et al. | 361/631 |
| 7,800,512 | B1 * | 9/2010 | Czarnecki | 340/693.1 |
| 7,816,602 | B2 | 10/2010 | Landry et al. | |
| 7,834,486 | B1 * | 11/2010 | Flegel et al. | 307/126 |
| 7,855,871 | B2 | 12/2010 | Hudgins et al. | |
| 7,864,509 | B1 | 1/2011 | Remmert | |
| 8,040,663 | B1 * | 10/2011 | Czarnecki | 361/632 |
| 8,138,433 | B2 * | 3/2012 | Czarnecki et al. | 200/50.32 |
| 2002/0125115 | A1 * | 9/2002 | Burkholder et al. | 200/51.11 |
| 2006/0158037 | A1 | 7/2006 | Danley et al. | |
| 2006/0202559 | A1 | 9/2006 | Hashimoto et al. | |
| 2007/0278071 | A1 * | 12/2007 | Flegel | 200/50.33 |
| 2008/0190747 | A1 * | 8/2008 | Carson et al. | 200/50.1 |
| 2009/0073641 | A1 * | 3/2009 | Ross | 361/626 |
| 2010/0038966 | A1 * | 2/2010 | Espeut, Jr. | 307/68 |
| 2010/0290604 | A1 | 11/2010 | Wright et al. | |
| 2011/0310534 | A1 * | 12/2011 | Cosley et al. | 361/632 |

OTHER PUBLICATIONS

AC Data Solutions, “ILC Series Integrated Load Center Solutions”, Feb. 20, 2007, 2 pages.

Emerson Network Power, “JuiceBox Power Transfer Switch (PTS)”, Jan. 1, 2006, pp. 1-6.

Pantrol, “Innovattive Power Solutions”, Jan. 1, 2009, 22 pages.

Gentran Corporation, “Power Centers”, May 21, 2008, 2 pages.

Square D, “Class 9421, Type FP-1 Door Mounted Operating Mechanism for Use With Square D Type KA Circuit Breaker”, Apr. 1, 1983, 1 page.

Square D, “Class 9421 Type L Door Mounted Operating Mechanisms for use with Square D Type KAL, KCL and KHL Circuit Breakers”, Jan. 1, 1994, 8 pages.

Thomson Technology, “Automatic Transfer Switches”, Aug. 5, 2001, 4 pages.

AC Data Solutions, “Power Protection Cabinet (PPC)”, Jul. 2, 2007, 2 pages.

AC Data Solutions, “Panel One Series ILC Integrated Load Center Solutions”, Feb. 29, 2007, 2 pages.

AC Data Solutions, “GenLox Alternate Power Connection Integrated Load Center & Shelter Solutions”, Jun. 23, 2008, 2 pages.

Electric Equipment & Engineering Co., “Panel One Integrated Load Center”, Feb. 29, 2007, 21 pages.

Square D, “Operating Mechanisms, Disconnect Switches, and Door-Closing Mechanisms Selection Guide”, Dec. 1, 1997, 44 pages.

Siemens, “General Duty 240 Volt, Type 1 (Indoor)”, Jan. 1, 2002, 1 page.

Siemens, “Siemens Enclosed Rotary Disconnect Switches”, Jan. 1, 2002, 2 pages.

Siemens, “Visible Blade Disconnect Switches”, Jan. 1, 2008, 12 pages.

Cutler-Hammer, “Safety Switches”, Jan. 1, 1999, 12 pages.

Ferraz Shawmut, “Enclosed Disconnect Switches”, Jan. 1, 2007, 8 pages.

GE Industrial Systems, “IEC Disconnect Switches Selection Guide”, Feb. 2, 2000, 6 pages.

Klockner Moeller, “Molded Case Circuit Breakers and Switches”, Jan. 1, 2007, 2 pages.

Klockner Moeller, “Molded Case Circuit Breakers and Switches, 600 A, 600 V AC”, Jan. 1, 2005, 2 pages.

Klockner Moeller, “Product Range Catalog | 2006 Switching, protection, communication—the new NZM-4 circuit-breaker series up to 1200 A”, Aug. 1, 2006, 176 pages.

Aron J. King, “Declaration of Aron J. King Under 37 C.F.R. 1.56”, Mar. 22, 2012, 26 pages.

* cited by examiner

PANELBOARD ENCLOSURE WITH EXTERNAL POWER CUTOFF SWITCH

BACKGROUND

1. Field of the Invention

The present invention relates to electrical panelboard enclosures, including but not limited to panelboard enclosures with power transfer switch functionality for alternate power source connection.

2. Description of the Prior Art

By way of background, electrical panelboard enclosures (also referred to as distribution boards, service panels, breaker panels, etc.) are used to distribute electrical power from a main power source to one or more subsidiary load circuits. Some panelboard enclosures provide the ability to selectively power the subsidiary circuits from the main power source, such as a utility power grid, and an alternate power source, such as a backup generator. This is known as power transfer switching. It is to improvements in electrical panelboard enclosures, and particularly panelboard enclosures equipped with power transfer switching capability, that the present invention is directed.

SUMMARY

An electrical panelboard enclosure includes an enclosure housing having a front, a back, first and second sides, a top, a bottom, an opening in the front, and an interior equipment chamber accessible via the front opening. A service entrance door is pivotally mounted on the enclosure housing and is positionable between a closed position wherein the front opening is covered and an open position wherein the front opening is exposed. A primary service panel in the equipment chamber is configured to receive power from a main power source and an alternate power source. A main power source wireway in the equipment chamber is arranged for routing main power source wiring to deliver main power to the primary service panel. An alternate power source connector array in the equipment chamber is accessible from outside the enclosure housing and configured to detachably connect to alternate power source cables. An alternate power source wireway in the equipment chamber routes preinstalled alternate power source wiring that interconnects the alternate power source connector array and the primary service panel. A distribution panel in the equipment chamber is operable to receive main or alternate power from the primary service panel and distribute the power to one or more subsidiary load circuits.

A service transfer switch unit is associated with the primary service panel. The service transfer switch unit is operable to selectively delivery main power and alternate power to the distribution panel. A main power breaker in the service transfer switch unit has a main power breaker toggle switch that is operable to selectively activate and deactivate main power to the distribution panel. An alternate power breaker in the service transfer switch unit has an alternate power breaker toggle switch operable to selectively activate and deactivate alternate power to the distribution panel. An interlock in the service transfer switch is operable to prevent simultaneous activation or deactivation of both the main power breaker toggle switch and the alternate power breaker toggle switch.

The panelboard enclosure further includes a power cutoff switch operable from outside the service entrance door to mechanically engage and deactivate the main power breaker toggle switch and cutoff main power without opening the service entrance door.

BRIEF DESCRIPTION OF THE DRAWINGS

The foregoing and other features and advantages of the invention will be apparent from the following more particular description of example embodiments, as illustrated in the accompanying Drawings, in which.

DETAILED DESCRIPTION OF EXAMPLE EMBODIMENT

Figure 1:
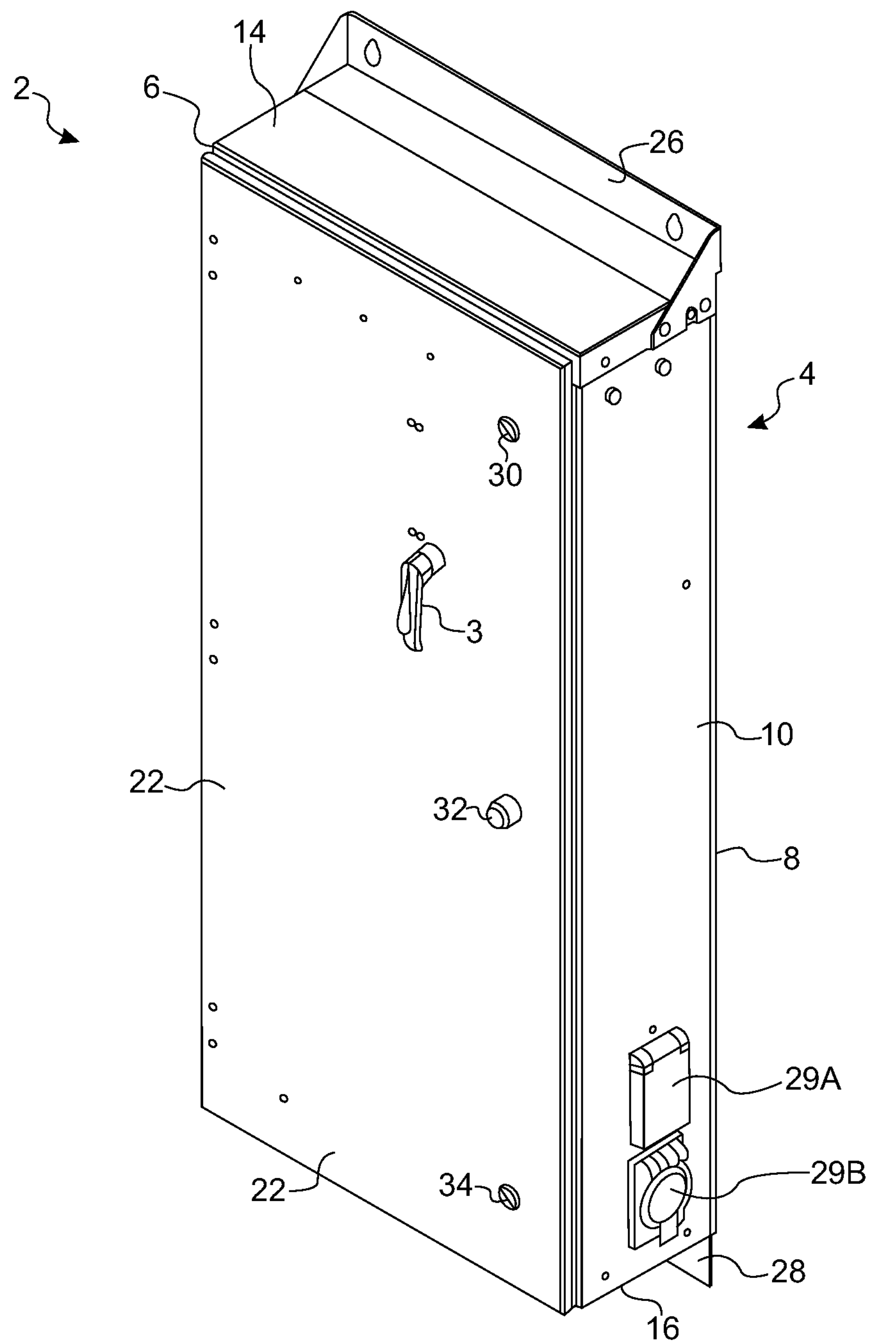
FIG. 1 is a perspective view showing an example panelboard enclosure according to the present disclosure.

Turning now to the drawing figures, wherein like reference numerals are used to represent like elements in all of the several views, FIG. 1 illustrates an embodiment of a panelboard enclosure 2 (also referred to herein as a panelboard), that may be constructed in accordance with the present disclosure. As described in more detail below, the panelboard 2 is operative to selectively distribute main power (e.g., from a utility power source or the like) or alternate power (e.g., from a backup generator or the like) to plural subsidiary load circuits. The panelboard 2 may be used in many different applications, but is particularly suited for outdoor use at an electrical equipment site, such as a cellular telephone tower or other location. Among the features that may be provided by the panelboard 2 are a power cutoff switch actuator mechanism 3 (hereinafter referred to for convenience as a "power cutoff switch") operable from outside the panelboard to allow fire crews or other emergency personnel to disconnect main utility power without having to enter the enclosure. Another feature is the ability to use a pre-fabricated assembly that allows most of the internal components of the panelboard 2 to be installed as a single unit when constructing or servicing the enclosure.

Figure 1A:
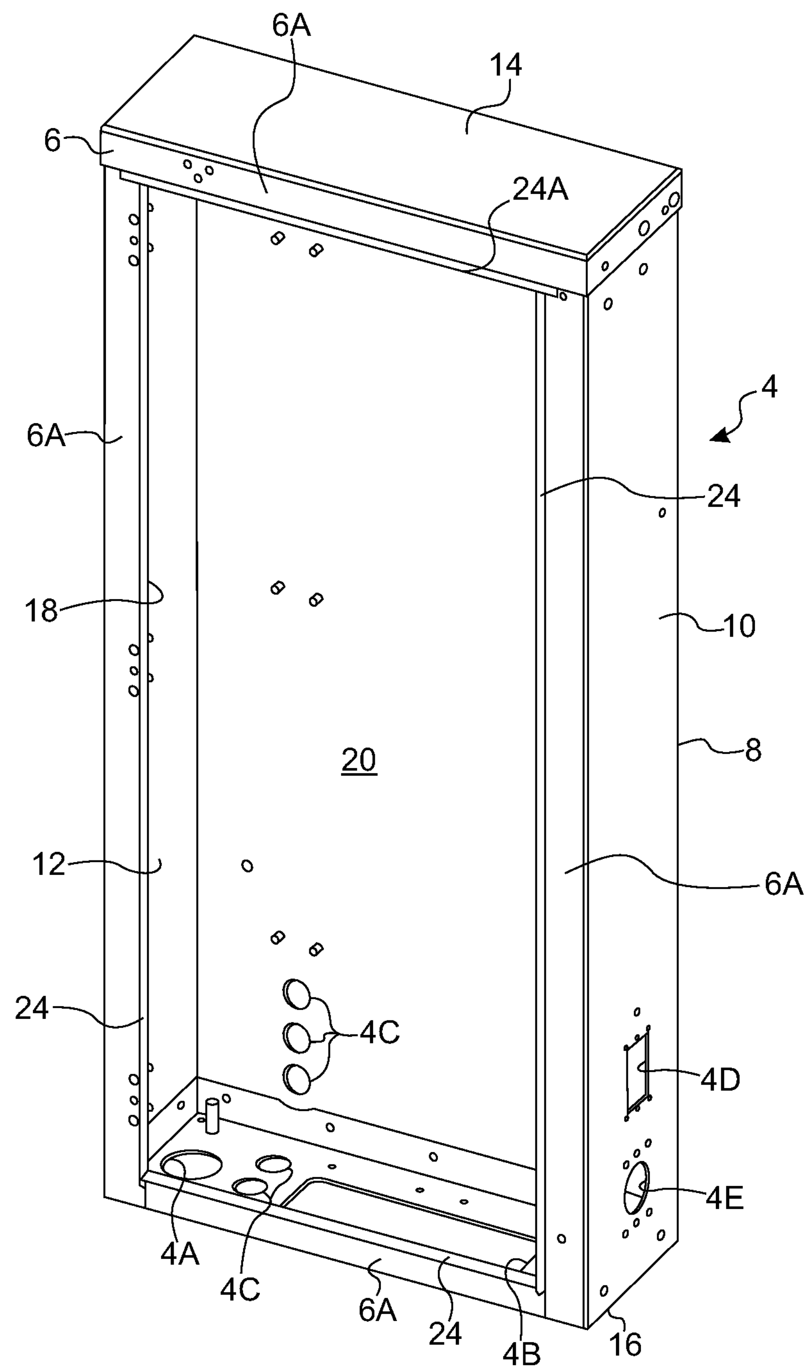
FIG. 1A is a perspective view showing an enclosure housing of the panelboard enclosure of FIG. 1.

With additional reference now to FIG. 1A, the panelboard 2 is constructed with a main enclosure housing 4 that provides a barrier against access to the panelboard's power control components (e.g., service switches and circuit breakers). The enclosure housing 4 is generally box-shaped and is formed with a front 6, a back 8, a right side 10, a left side 12, a top 14 and a bottom 16. Other enclosure shapes may also be used. The front 6 is provided with a bezel frame 6A that defines a large opening 18. The opening 18 allows access to an interior equipment chamber 20 within the enclosure housing 4.

Figure 2:
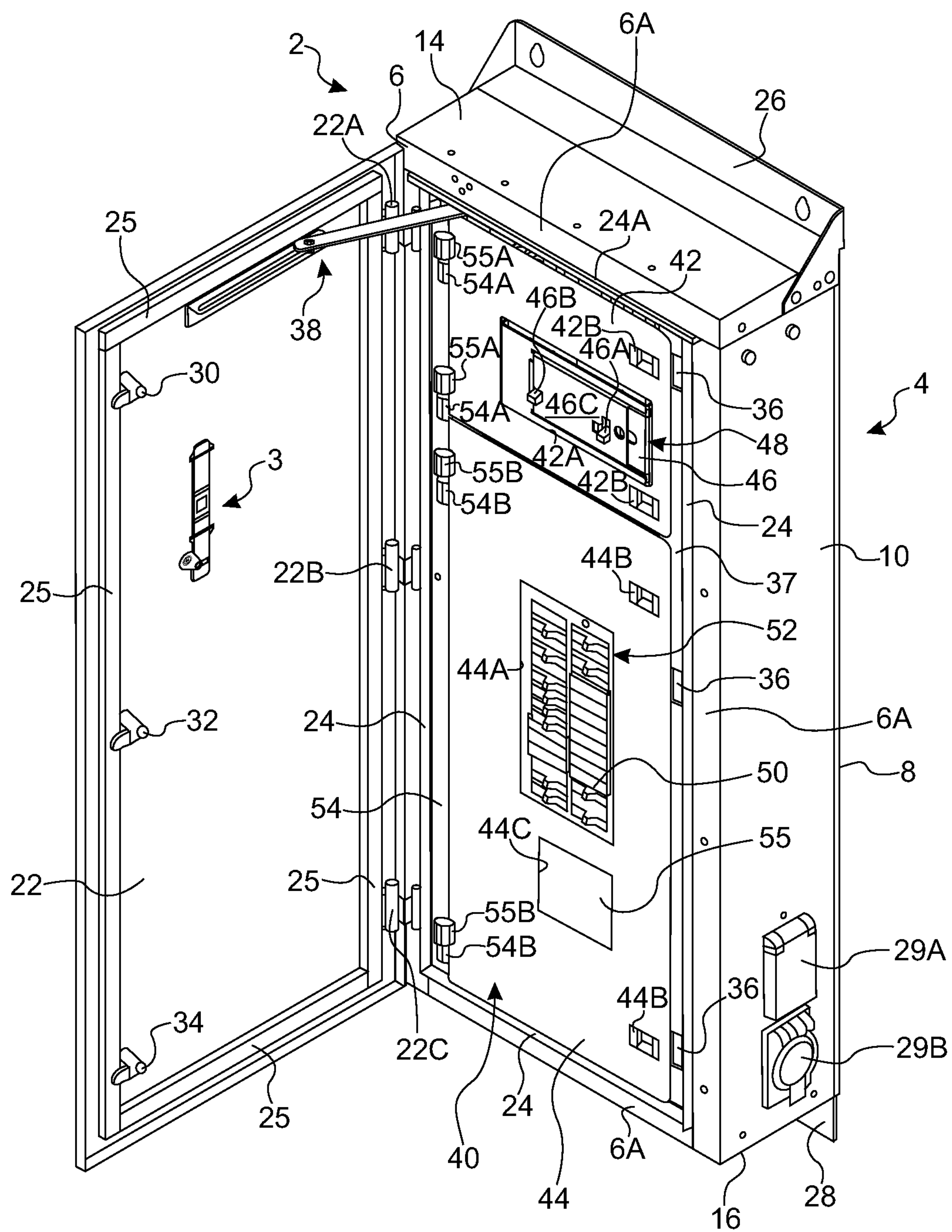
FIG. 2 is a perspective view showing the panelboard enclosure of FIG. 1 with a service entrance door in an open position.

With additional reference now to FIG. 2, a service entrance door 22 is pivotally mounted on the enclosure housing 4 using hinges 22A, 22B and 22C. The service entrance door 22 is positionable between a closed position wherein the front opening 18 is covered (see FIG. 1) and an open position wherein the front opening is exposed (see FIG. 2). In order to help seal the equipment chamber 20 from the elements, the bezel frame 6A may be formed with a peripheral lip 24, an upper horizontal portion of which is shaped to provide a drip gutter 24A. As can be seen in FIG. 2, the service entrance door 22 may be provided with a peripheral seal 25 made of soft resilient material (e.g., foam weather stripping) that engages the peripheral lip 24 when the door is closed. If desired, optional upper and lower mounting brackets 26 and 28 may be mounted on the enclosure housing 4 to facilitate attaching the panelboard 2 to a mounting structure, such as a poll, a framework, a wall, etc. Alternatively, or in addition, mounting apertures (not shown) may be drilled, cut or otherwise formed in the back 8 of the housing. According to a further mounting scheme, the bottom 16 of the enclosure housing 4 may be seated on a plinth (not shown) that is mounted on a support base (not shown).

As can be seen in FIG. 1A, the bottom 16 of the enclosure housing 4 is formed with a circular aperture 4A for receiving main power source wiring (not shown). The bottom 16 of the enclosure housing 4 is also formed with a generally rectangular opening 4B for receiving alternate power source cables (not shown) that may be detachably connected within the enclosure housing (as described in more detail below). The bottom 16 and the back 8 of the enclosure housing are further formed with a set of circular apertures 4C that receive distribution power wiring (not shown). On the right side 10 of the enclosure housing 4, two apertures 4D and 4E are provided for respectively mounting 120 V and 240V plugs 29A and 29B, as shown in FIGS. 1 and 2. It will be appreciated that the structural components of the enclosure housing 4 can be made from any suitable material that is relatively rigid and strong, including sheet metal (e.g., steel) or a non-metallic material such as plastic or a composite.

The service entrance door 22 can be locked in its closed position using one or more key-activated cam locks. The number of cam locks will typically depend on the size of the enclosure 2 and/or applicable electrical code specifications. Three such cam locks 30, 32 and 34 are shown in FIGS. 1 and 2. The cam locks 30, 32 and 34 may be formed with a security lock pattern (such as an undulating groove) that requires a corresponding security key. As can be seen in FIG. 2, the cam locks 30, 32 and 34 engage keeper openings 36 formed in a keeper plate 37 mounted to the right-hand vertical member of the front bezel frame 6A. If desired, nonconductive backing cups (not shown) may be mounted on the inside of the keeper openings 36 to isolate the cam locks 30, 32 and 34 from any live conductors within the equipment chamber 20 that might be in the vicinity. A wind latch mechanism 38 limits pivoting of the service entrance door 22 and allows it to be locked in the open position.

With continuing reference to FIG. 2, the service entrance door 22 opens to reveal a dead front 40. The dead front 40 includes an upper dead front door 42 and a lower dead front door 44. The upper dead front door 42 is formed with a cutout 42A that exposes a service transfer switch unit 46 of a primary service panel 48. The primary transfer switch unit 46 includes a main power breaker toggle switch 46A, an alternate power breaker toggle switch 46B, and an interlock mechanism 46C. The lower dead front door 44 is formed with a cutout 44A that exposes a set of distribution breakers 50 of a distribution panel 52. Both of the dead front doors 42 and 44 are pivotally mounted to a hinge plate 54 that is in turn mounted to the enclosure housing 4 (as described in more detail below). The hinge plate 54 carries upper and lower sets of hinge mounts 54A and 54B to which the dead front doors 42 and 44 are respectively attached. The hinge mounts 54A and 54B can be made from any suitable material, such as an abrasion resistant polymer. The upper and lower dead front doors 42 and 44 each include mating hinge hardware 55A and 55B that couples to the pins of the hinge mounts 54A and 54B. Both of the dead front doors 42 and 44 are also respectively provided with slide latches 42B and 44B that are configured to engage the inside lip of the keeper plate 37. A second cutout 44C on the lower dead front door 44 may be provided in cases where the panelboard 2 includes a transient voltage surge suppressor (TVSS) unit 55, also known as a surge protection device (SPD).

Figure 3:
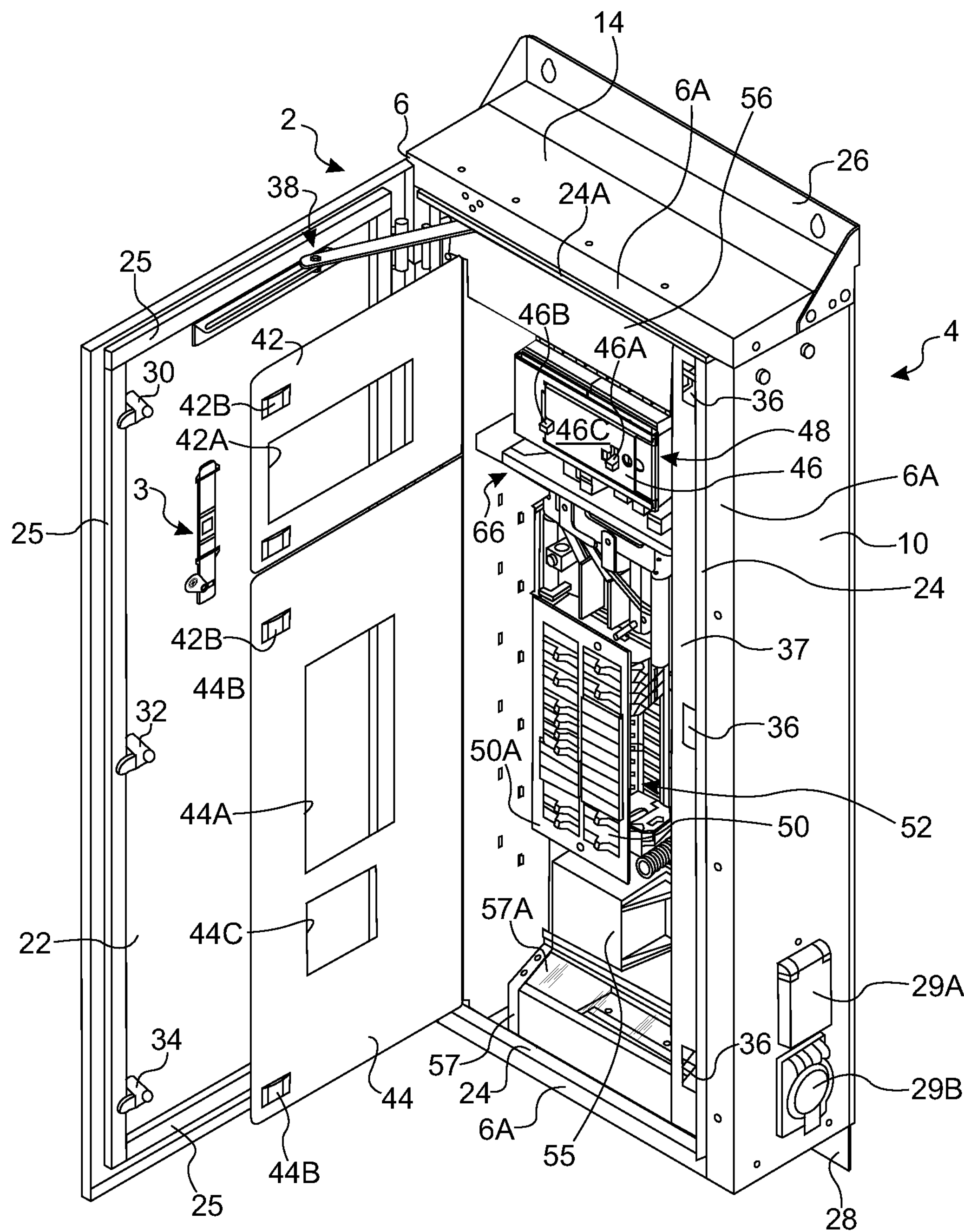
FIG. 3 is a perspective view showing the panelboard enclosure of FIG. 1 with a primary service panel door and a distribution panel door in an open position.

The upper and lower dead front doors 42 and 44 may be opened as shown in FIG. 3. Opening the upper dead front door 42 reveals more of the service transfer switch unit 46 and the primary service panel 48, but with the upper portion thereof being covered by a primary service panel cover plate 56. The cover plate 56 is detachably mounted to the hinge plate 54 and the keeper plate 37, and serves to cover the hot, neutral and ground electrical connector blocks of the primary service panel 48. The electrical connector blocks and other components of the primary service panel 48 are described in more detail below. Opening the lower dead front door 44 fully reveals the distribution panel 52 and its distribution breakers 50, as well as the surge suppressor 55. The distribution breakers 50, the surge suppressor and other components of the distribution panel 52 are also described in more detail below. At the bottom of the enclosure 4, it will also be seen that the lower dead front door 44 covers a connector compartment 57 having a viewing window 57A. As described in more detail below, the connector compartment 57 contains an array of alternate power source connectors (not shown in FIG. 3) that are used to connect a generator or other alternate power source to the enclosure 2. A circuit breaker face plate 50A is also visible when the lower dead front door 44 is open.

Figure 4:
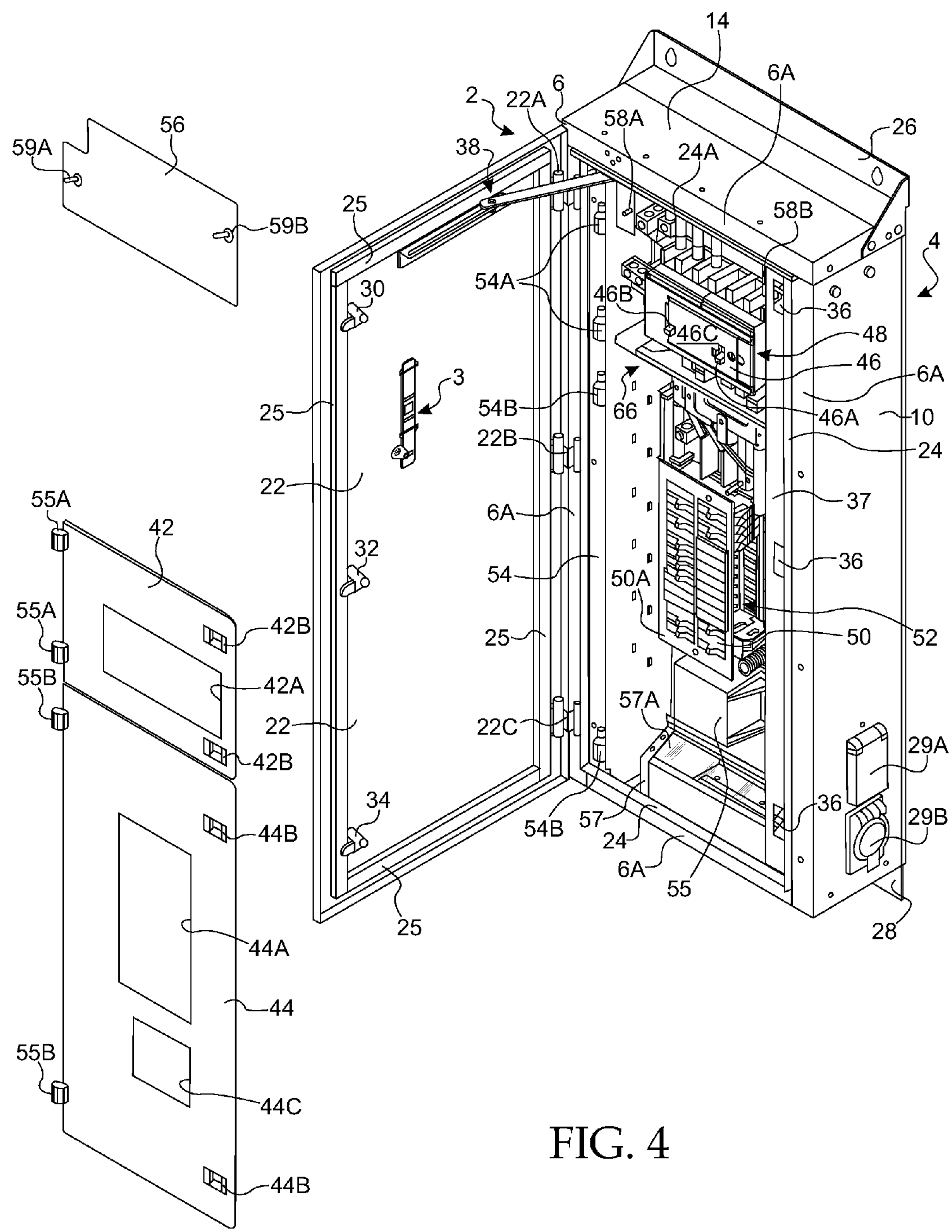
FIG. 4 is an exploded perspective view showing the paneboard enclosure of FIG. 1 after removal of a primary service panel door, a distribution panel door and a primary service panel cover.

FIG. 4 illustrates that the upper dead front door 42 and the lower dead front door 44 may be detached from the hinge mounts 54A and 54B if necessary during installation or servicing of the panelboard 2. As also shown in FIG. 4, the cover plate 56 may be removed from a pair of cover plate mounting studs 58A and 58B that may be respectively provided on the keeper plate 37 and the hinge plate 54. The cover plate 56 may be secured to the mounting studs using wing nuts 59A and 59B so that tools are not required for the cover plate removal operation.

Figure 5:
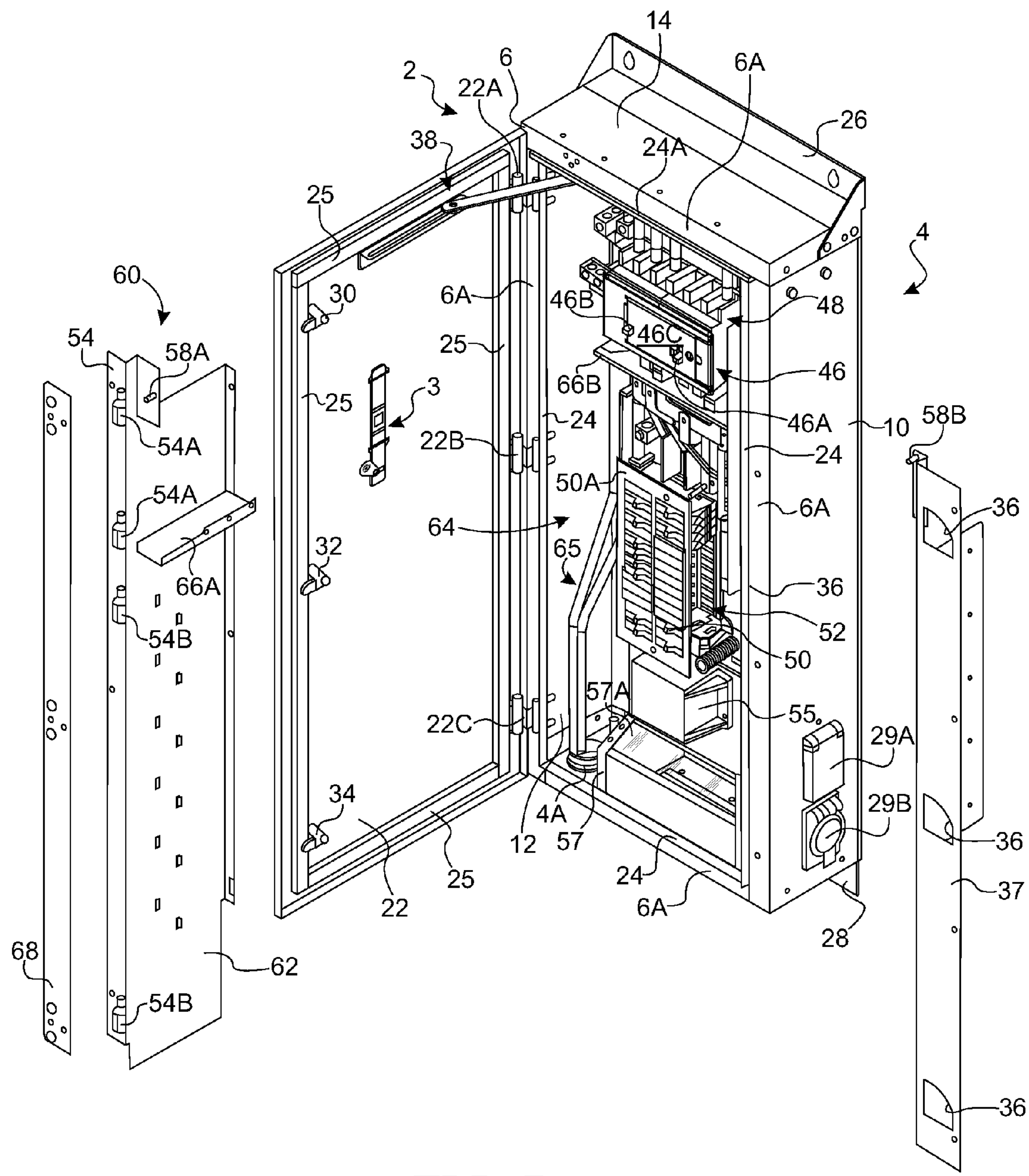
FIG. 5 is an exploded perspective view showing the paneboard enclosure of FIG. 1 after removal of a main power wiring compartment cover and a striker plate.

With additional reference now to FIG. 5, the keeper plate 37 and the hinge plate 54 may be constructed to allow for their detachment from the enclosure housing 4. The hinge plate 54 may be formed as part of a larger frame structure 60 that includes a generally planar cover plate 62. The cover plate 62 extends parallel to the left side 12 of the enclosure housing 4, but is spaced therefrom to provide a main power source wireway 64. The main power source wireway 64 allows main power source wiring 65, which is received through the aperture 4A in the enclosure housing 4, to be routed to the primary service panel 48 within a protective compartment. For ease of illustration, only the neutral and ground wires of the main power source wiring 65 are shown in FIG. 5. The frame structure 60 also includes a barrier stub plate 66A that combines with a barrier stub plate 66B to provide a main barrier plate 66, which is shown in its assembled configuration in FIGS. 3-4. The main barrier plate 66 is disposed between the primary service panel 48 from the distribution panel 52 and helps isolate the respective electrical components thereof. FIG. 5 further illustrates that the frame structure 60 may be attached to the enclosure housing 4 by way of an intermediate support bracket 68 that is secured to the left-hand bezel frame member 6A.

Figure 6:
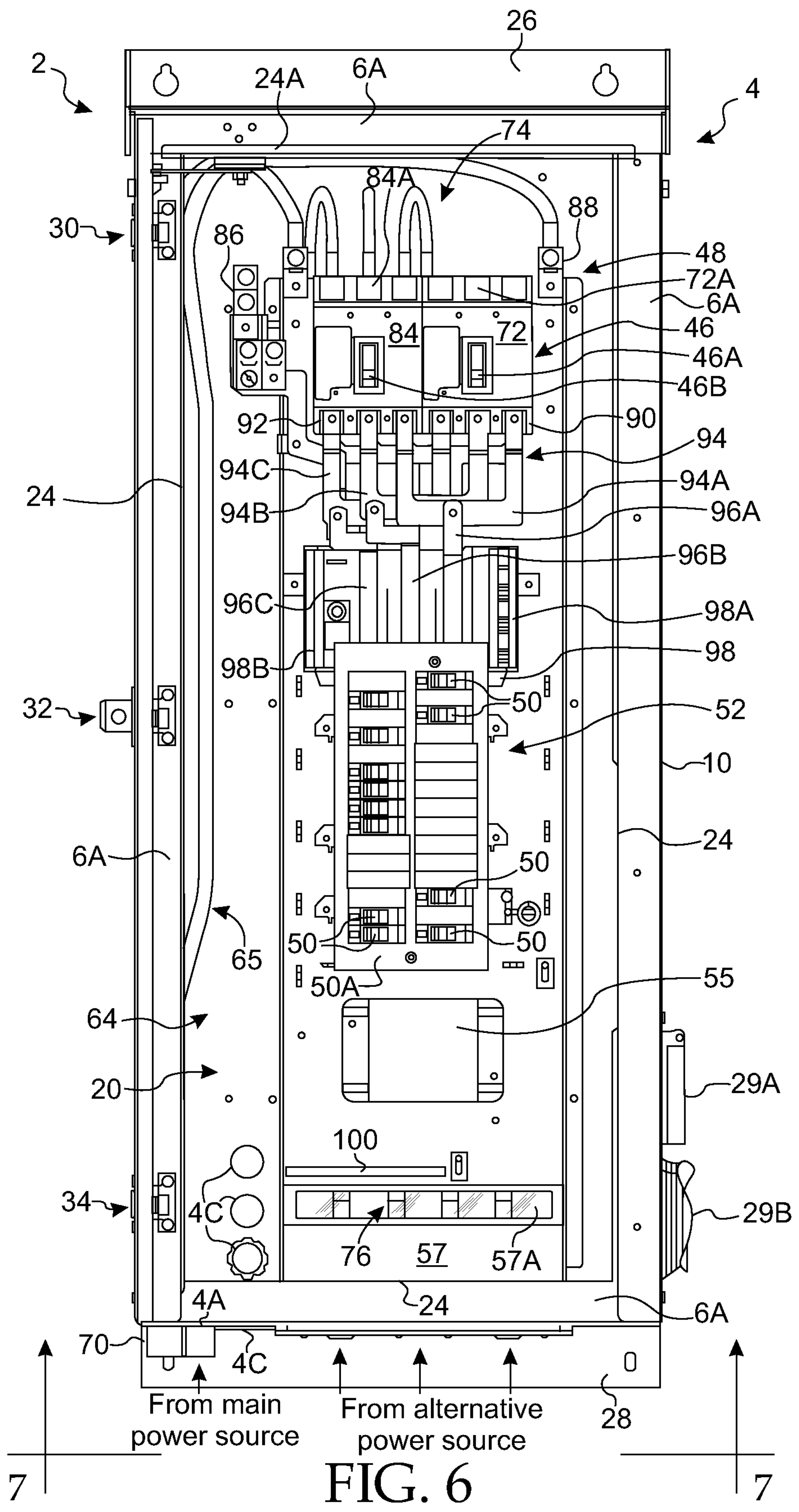
FIG. 6 is a front elevation view showing the panelboard enclosure of FIG. 1 in the disassembly state of FIG. 5.

Turning now to FIG. 6, the electrical components of the panelboard enclosure 2 may now be described in more detail. To provide an unobstructed view of the electrical components, FIG. 6 shows the panelboard 2 in the disassembly state of FIG. 5. In particular, the keeper plate 37, the frame structure 60 and the bracket 68 have been removed. In addition, the interlock mechanism 46C of the power transfer switch unit 46 has also been removed to provide a clearer view of the switch unit's breaker components. Finally, the barrier stub plate 66B has been removed to better illustrate the electrical busses interconnecting the primary service panel 48 and the distribution panel 52.

As introduced above, the panelboard enclosure 2 includes a primary service panel 48 and a distribution panel 52, both of which are disposed within the interior equipment chamber 20 of the enclosure housing 4. The primary service panel 48 is configured to receive power from both a main power source (such as a public electrical utility) and an alternate power source (such as a backup generator). Note that FIG. 6 depicts a three-phase embodiment of the panelboard 2. A single phase embodiment may be constructed in substantially the same manner.

Main power is delivered to the primary service panel 48 by way of the main power source wiring 65 described in connection with FIG. 5. Again, for ease of illustration, only the neutral and ground wires of the main power source wiring 65 are shown. The main power source wiring 65 will typically be installed when the panelboard 2 is initially placed in service. The routing path enters the enclosure housing 4 through a cable fitting 70 mounted in the aperture 4A. The routing path then proceeds upwardly through the wireway 64 to the top of the enclosure housing 4, then bends approximately 180 degrees for the final leg to the service transfer switch unit 48. The main power source wiring 65 connects to a main power breaker 72 of the service transfer switch unit 48. The main power breaker 72 includes a main power breaker connector block 72A. Note that the main power breaker 72 also includes the main breaker toggle switch 46A mentioned above in connection with FIG. 3.

Alternate power is delivered to the primary service panel 48 by way of alternate power source wiring 74 that is routed from an alternate power source connector array 76 situated in the connector compartment 57 mentioned above in connection with FIG. 3. For ease of illustration, only the three hot wires of the alternate power source wiring are shown in FIG. 6, with the neutral and ground wires being omitted. Unlike the main power source wiring 65, the alternate power source wiring 74 will typically be preinstalled in the enclosure housing 4 when the panelboard 2 is manufactured and prior to placing it in service.

Figure 7A:
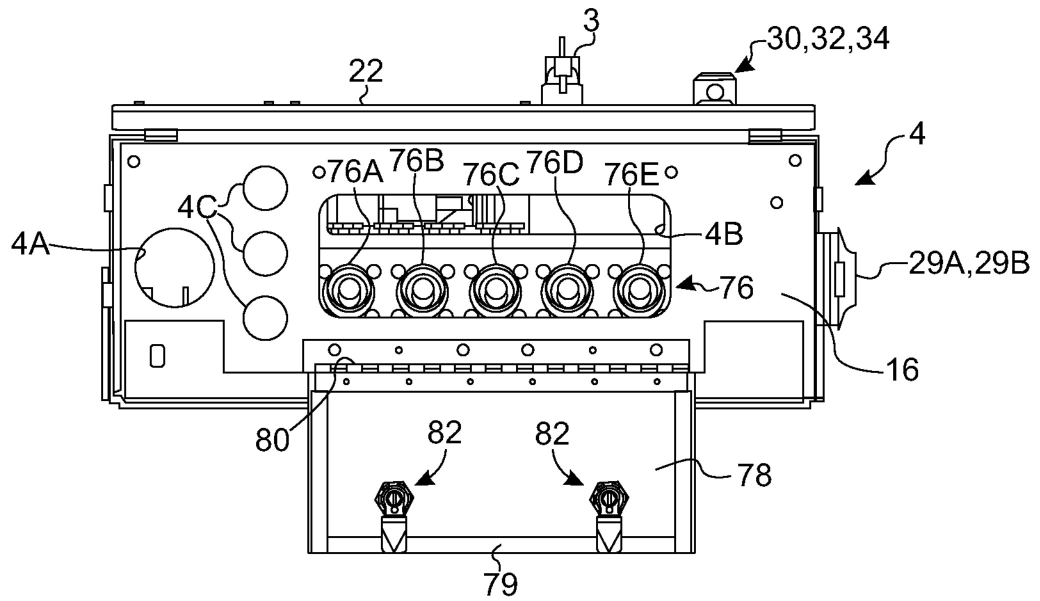
FIG. 7A is a bottom plan view showing an access opening for accessing an alternate power source connector array of the panelboard enclosure of FIG. 1.

FIG. 7A shows the connector array 76 in more detail according to an example three-phase power embodiment. In this embodiment, each connector 76A-76E is implemented as a cylindrical male connector plug of conventional design. Each connector 76A-76E faces downwardly (to facilitate moisture dissipation) and is configured to connect to a corresponding plug receptacle (not shown) mounted on the end of a generator cable or other alternate power feed line. Many other connector designs could also be used. The connector array 76 is accessed from the bottom 16 of the enclosure housing through the elongated aperture 4B discussed above in connection with FIG. 1A.

Because FIG. 7A illustrates a three-phase embodiment, there are five connectors 76, namely a ground connector 76A, a neutral connector 76B and three hot connectors 76C, 76D and 76E. As described below in connection with FIG. 8A, these connectors will respectively connect to alternate power source wires 74A, 74B, 74C, 74D and 74E of the alternate power source wiring 74. In a single-phase implementation, the connectors 76 would be similar except that only two hot connectors 76C and 76D would be required. As described below in connection with FIG. 8B, these connectors will respectively connect to alternate power source wires 74A, 74B, 74C and 74D of the alternate power source wiring 74. Advantageously, alternate power source cables can be attached individually to the corresponding connectors 76A-76E. Special multi-plug connectors are not required.

Figure 7B:
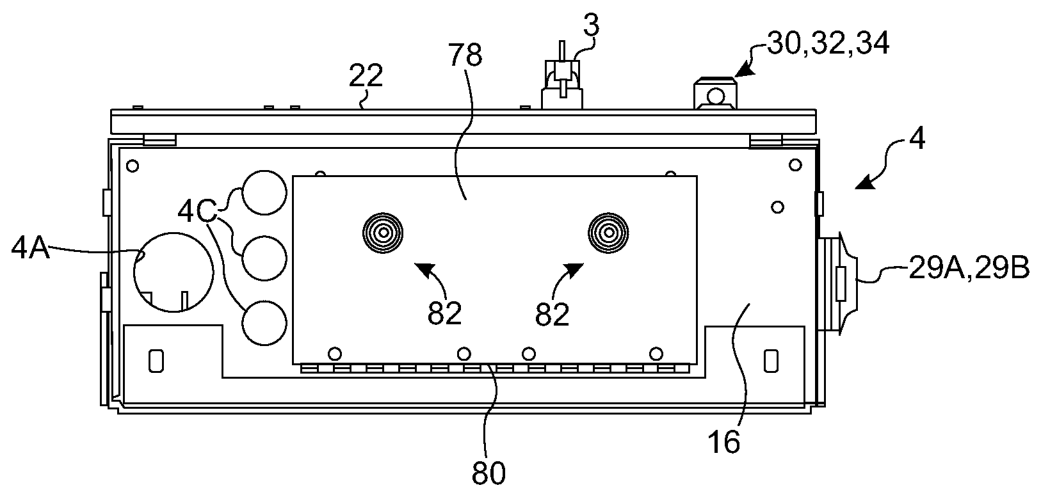
FIG. 7B is a bottom plan view showing the access opening of FIG. 7A following closure thereof.

The alternate power source connector array 76 is accessible from outside the enclosure housing 2 through a connector compartment access door 78. As additionally shown in FIG. 7B, the access door 78 may be mounted to the enclosure housing bottom 16 by way of a piano hinge 80. Other mounting arrangements could also be used. A pair of cam locks 82 may be provided for latching the access door 78 to the enclosure housing bottom 16. Like the cam locks 30, 32 and 34 on the service entry door 22, the cam locks 82 may be designed to require a security key (not shown) in order to unlatch the access door 78 and gain access to the connector array 76. As shown in FIG. 7A, a resilient foam seal 79 (or other sealing member) may be provided around the periphery of the inside surface of the service entry door 22 in order to help seal the connector compartment 57 from the outside environment.

Returning now to FIG. 6, the alternate power source wiring 74 extends from the connector array 76 to an alternate power breaker 84 in the primary service panel 48. The alternate power breaker 84 includes an alternate power breaker connector block 84A to which the alternate power source wiring 74 is connected. Note that the alternate power breaker 84 also includes the alternate breaker toggle switch 46B mentioned above in connection with FIG. 3.

The primary service panel 48 further includes a neutral connector block 86 and a ground connector block 88. In addition, the main power breaker 72 and the alternate power breaker 84 include bus connector blocks 90 and 92 for mounting a network of bus bars 94 that carry power toward the distribution panel 52. The bus bar network 94/96 includes a set of upper bus bars 94A, 94B and 94C that interconnect the main power breaker 72 and the alternate power breaker 84. The upper bus bars 94A, 94B and 94C carry power out of the primary service panel and deliver it to the distribution panel 52. In particular, the upper bus bars 94A, 94B and 94C are respectively connected to a set of lower bus bars 96A, 96B and 96C that carry power to the circuit breakers 50. The circuit breakers 50 and the operation of the distribution panel 52 are conventional in nature, as is the TVSS unit (SPD) 55.

The service transfer switch unit 46 of the primary service panel 48 is operable to selectively delivery main power and alternate power via the bus bar network 94 to the distribution panel 52. In particular, the main power breaker toggle switch 46A is used to selectively activate and deactivate main power to the distribution panel 52 while the alternate power breaker toggle switch 46B is used to selectively activate and deactivate alternate power to the distribution panel 52. Although not shown in FIG. 6, the interlock mechanism 46C of the service transfer switch unit 46 prevents simultaneous activation or deactivation of both the main power breaker toggle switch 46A and the alternate power breaker toggle switch 46B. The interlock mechanism 46C implements a conventional design wherein the mechanism is slidable between a left-hand position wherein only the main power breaker toggle switch 46A can be activated and a right-hand position wherein only the alternate power breaker toggle switch 46B can be activated.

The distribution panel 52 is configured to receive main or alternate power from the primary service panel 48 in the manner described above, and to distribute the power to one or more subsidiary load circuits. As mentioned above in connection with FIG. 2, the distribution panel 52 includes plural circuit breakers 50, several of which are shown in FIG. 6. Although the total circuit breaker capacity is thirty, it will be appreciated that capacity for a larger or smaller number of circuit breakers may be provided. The circuit breakers 50 are mounted to a conventional breaker support and bus bar framework 98. The upper portion of the framework 98 includes a pair of neutral connector blocks 98A and 98C for making neutral connections in the load circuits. The lower portion of the framework 98 carries the circuit breakers 50 using a conventional breaker mounting scheme that, by way of example, allows the circuit breakers to be snapped into place for engagement with one or more of the bus bars 96A, 96B and 96C, depending on the voltage to be delivered to the corresponding load circuit. A ground bar 100 located just above the alternate power connector compartment 57 is used for making ground connections in the load circuits. Load circuit wiring comes in from the apertures 4C.

Figure 8A:
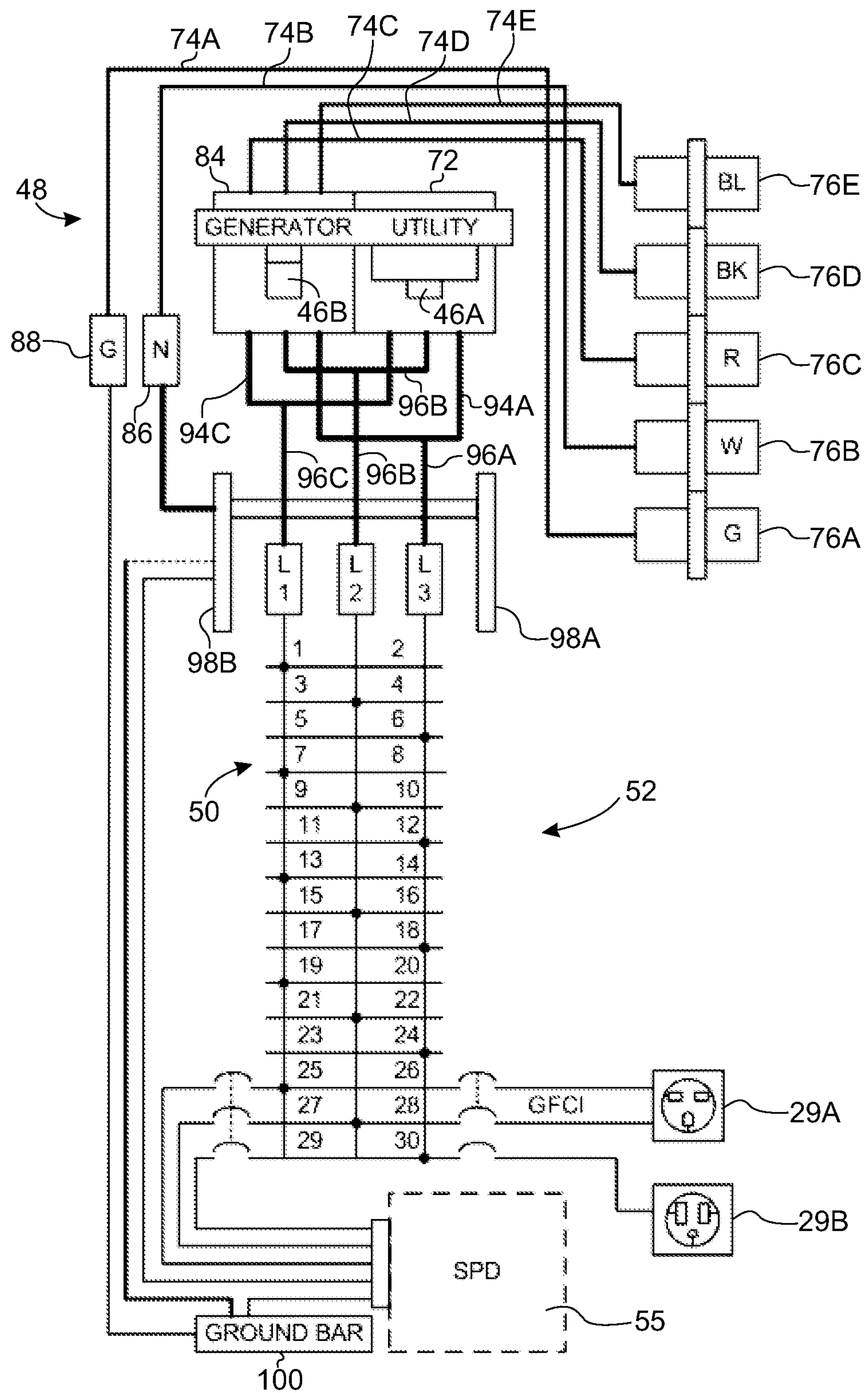
FIG. 8A is a schematic wiring diagram showing a three-phase embodiment of the panelboard enclosure of FIG. 1.
Figure 8B:
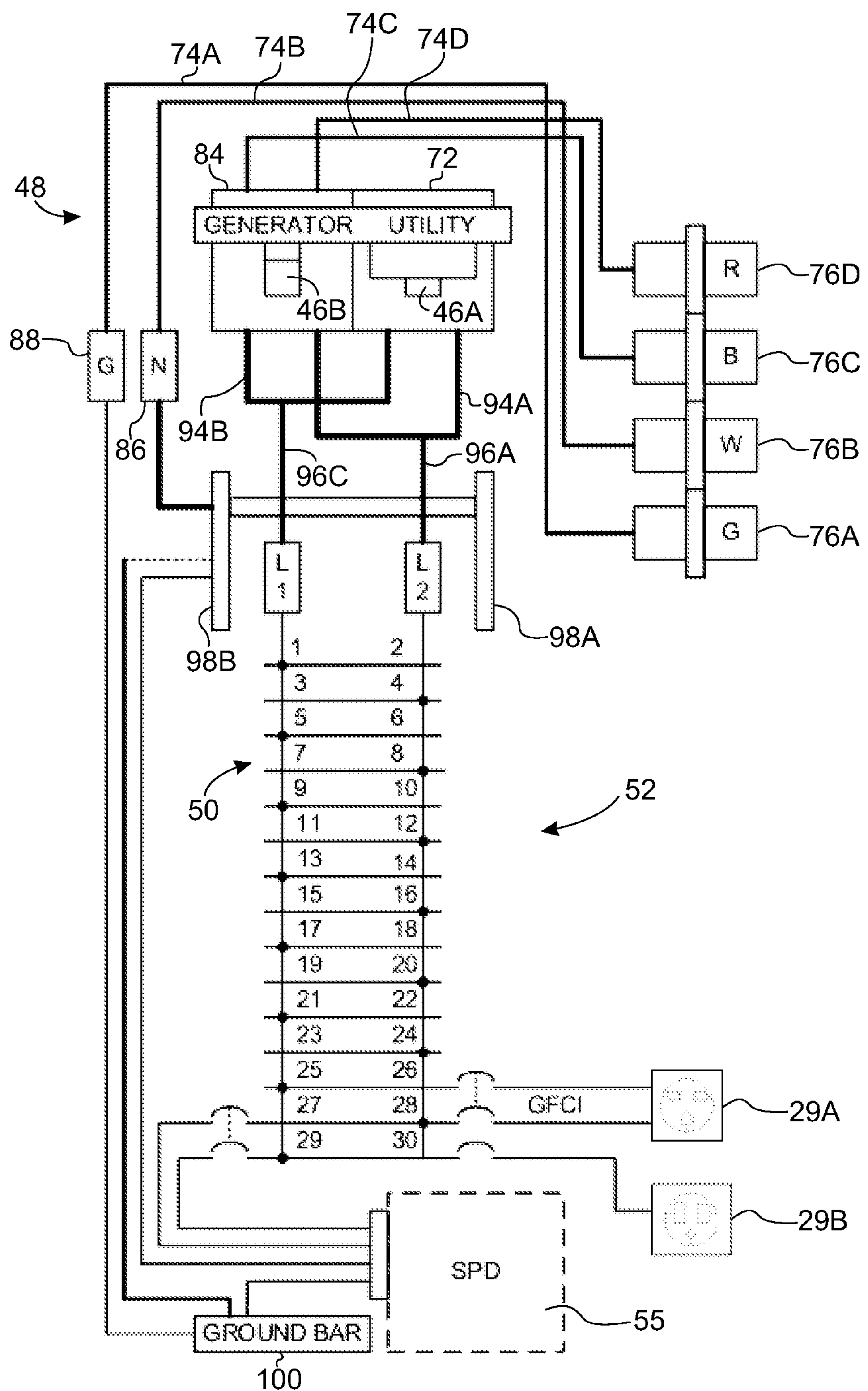
FIG. 8B is a schematic wiring diagram showing a single-phase embodiment of the panelboard enclosure of FIG. 1.

Schematics of the panelboard's electrical components are respectively shown in FIGS. 8A and 8B for three-phase and single-phase implementations. In the three-phase embodiment of FIG. 8A, there are five alternate power source wires 74, namely a ground wire 74A, a neutral wire 74B and three hot wires 74C, 74D and 74E. In the single-phase embodiment of FIG. 8B, only two hot wires 74C and 74D are required. Other electrical components of the primary service panel 48 and the distribution panel 52 are identified by the use of corresponding reference numbers.

Using the alternate power source connector array 76 and the service transfer switch unit 46, a main power failure may be dealt with in the following manner. Upon a determination that power from the main power source has been interrupted, the access door 78 to the connector compartment 57 may be opened and individual cables of an alternative power source (e.g., a generator) may be connected to individual connectors of the alternate power source connector array 76. Alternatively, these steps may be skipped if an alternate power source is already connected. The service entrance door 22 may now be opened so that the main power breaker toggle switch 46A can be actuated to a power off position. The interlock mechanism 46C may then be manipulated to a position that allows actuation of the alternate power breaker toggle switch 46B while preventing actuation of the main power breaker toggle switch 46A. Actuating alternate power breaker toggle switch 46B to a power-on position will apply power from the alternate power source to the distribution panel 52. At this point, the power cutoff switch 3 may be placed in a power-off position. This position will allow the power cutoff switch 3 to engage the powered-off main power breaker toggle switch 46A as the service entrance door 22 closes.

Turning now to FIGS. 9-13, the panelboard enclosure 2 may be constructed using an arrangement in which the primary service panel 48, the distribution panel 52, the alternate power source connector array 76, the alternate power source wiring 74 and the service transfer switch unit 46 are part of an installable panelboard assembly 102 that is mountable as a unit within the enclosure housing 4 (not shown in FIGS. 9-12). Advantageously, this allows nearly the entire panelboard 2 to be assembled, tested and installed at a manufacturer's facility, with all of the alternate power source wiring connections being made. Field installation of the enclosure 2 only requires connection of the main power source wiring 65 and the load circuit wiring that connects to the distribution panel 52.

The panelboard assembly 102 is constructed with a base panelboard assembly frame 104. The base assembly frame 104 can be fabricated from sheet steel or the like that is formed or assembled to provide a desired configuration. In the embodiment of FIGS. 9-12, the base assembly frame 104 is configured as an elongated channel having a relatively wide component mounting platform 106 and a pair of comparatively narrow side sections 108 and 110. The front side of the mounting platform 106 (shown in FIGS. 9 and 10) mounts the components of the primary service panel 48 (including the service transfer switch unit 46) and the components of the distribution panel 52 (including the framework 98 and the SPD 55). The rear side of the mounting platform 106 (shown in FIG. 11) mounts the connector array 76. Each side section 108 and 110 is formed with a respective flange 108A and 110A that is provided with mounting holes 112 for fastening the base assembly frame 104 to the back 20 of the enclosure housing 4.

Figure 11:
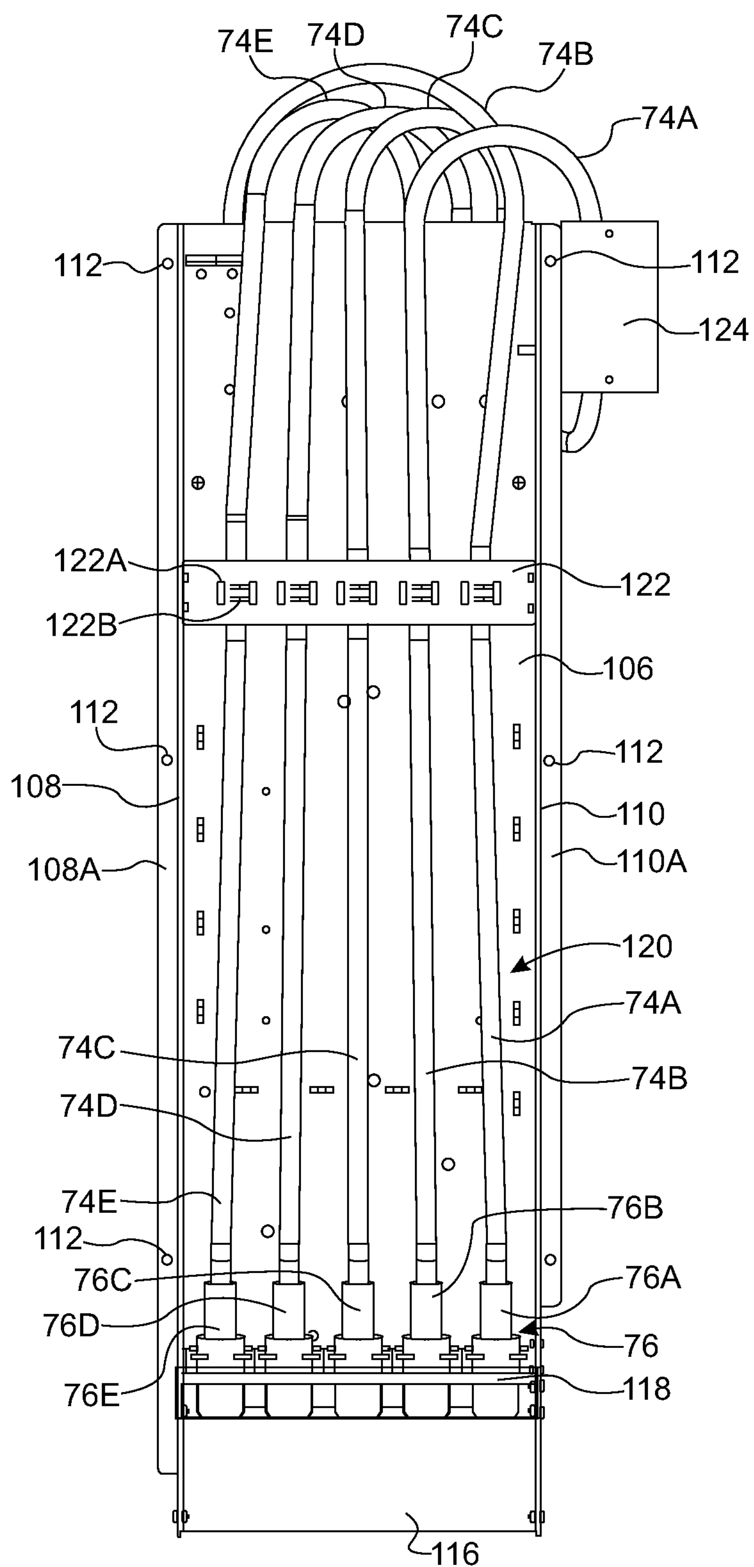
FIG. 11 is a rear elevation view showing the service assembly of FIG. 9.

Near the bottom of the base assembly frame 104, the mounting platform 106 terminates at its lower end and the side sections 108 and 110 are respectively provided with forwardly extending flanges 108B and 110B. The flanges 108B and 110B define the sides of the connector compartment 57. They also support an angled view window frame member 114 (that contains the viewing window 57A) and a front member 116. As can be seen in FIG. 11, the connector array 76 is supported by a connector array mounting plate 118 that closes off the top of the connector compartment 57. FIG.

13 shows that the connector array mounting plate 118 may be angled in order to orient the alternate power source connector array 76 slightly forwardly to aid in making connections thereto.

Figure 9:
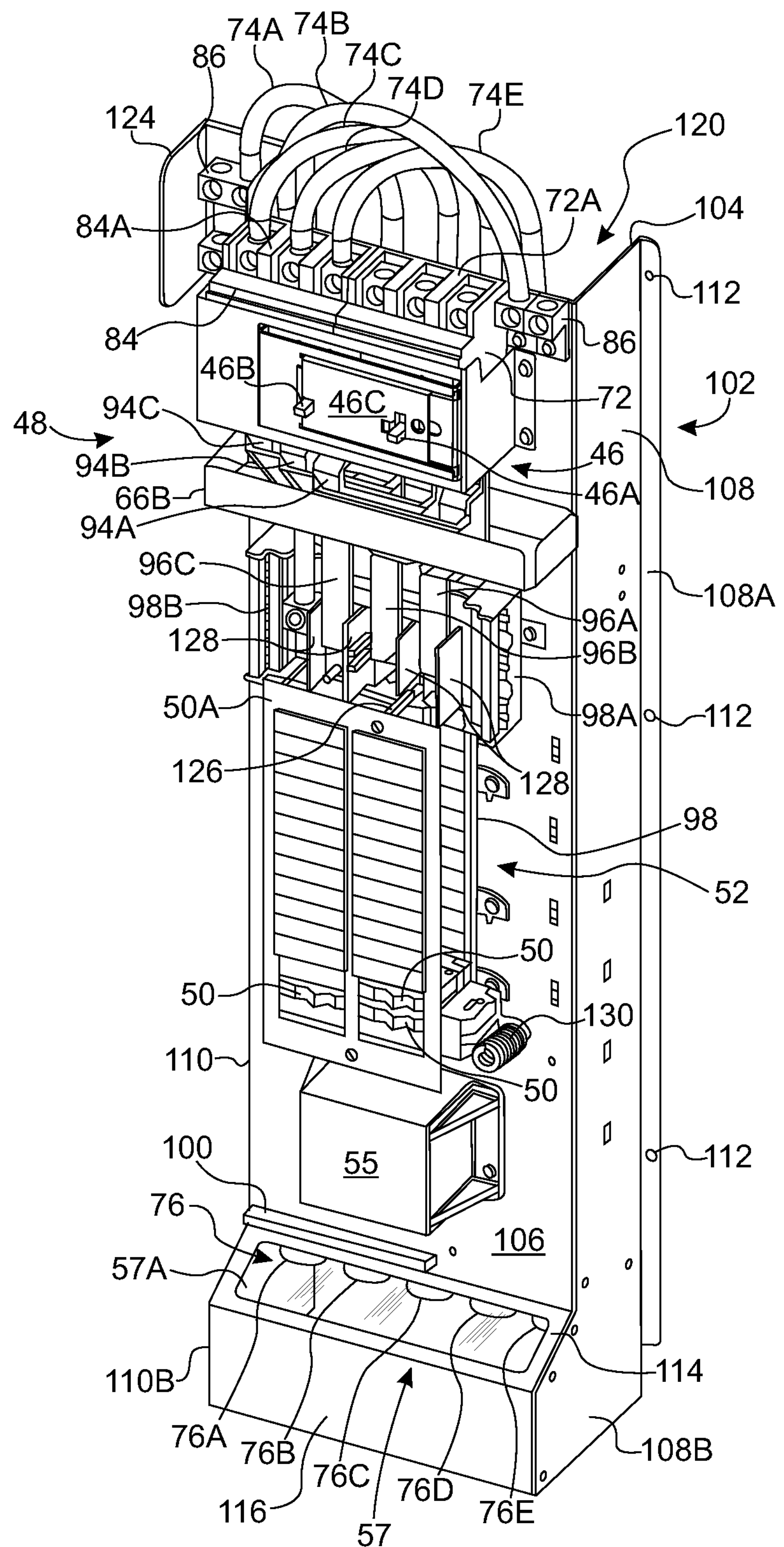
FIG. 9 is a perspective view showing a service assembly that may be installed in the panelboard enclosure of FIG. 1.
Figure 10:
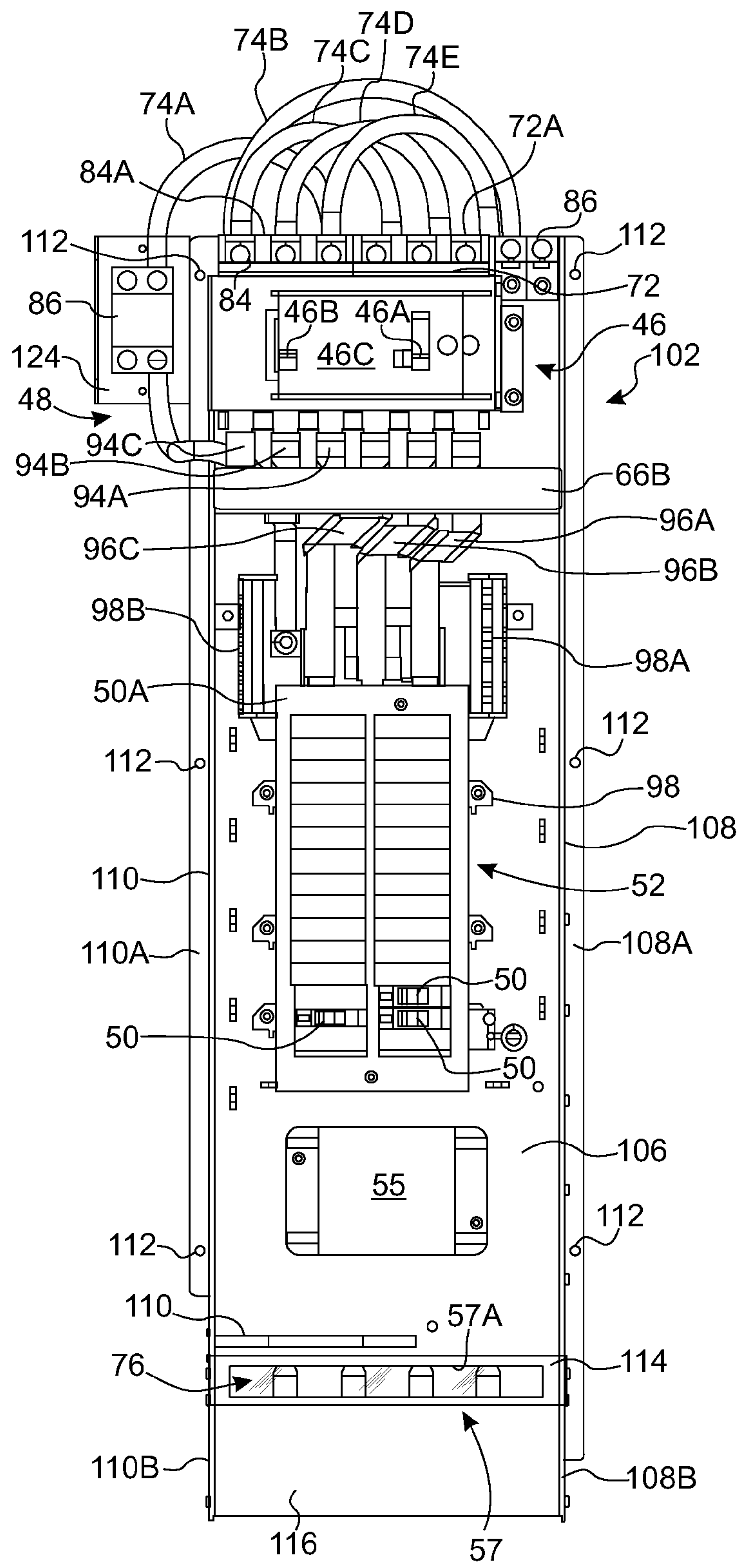
FIG. 10 is a front elevation view showing the service assembly of FIG. 9.
Figure 12:
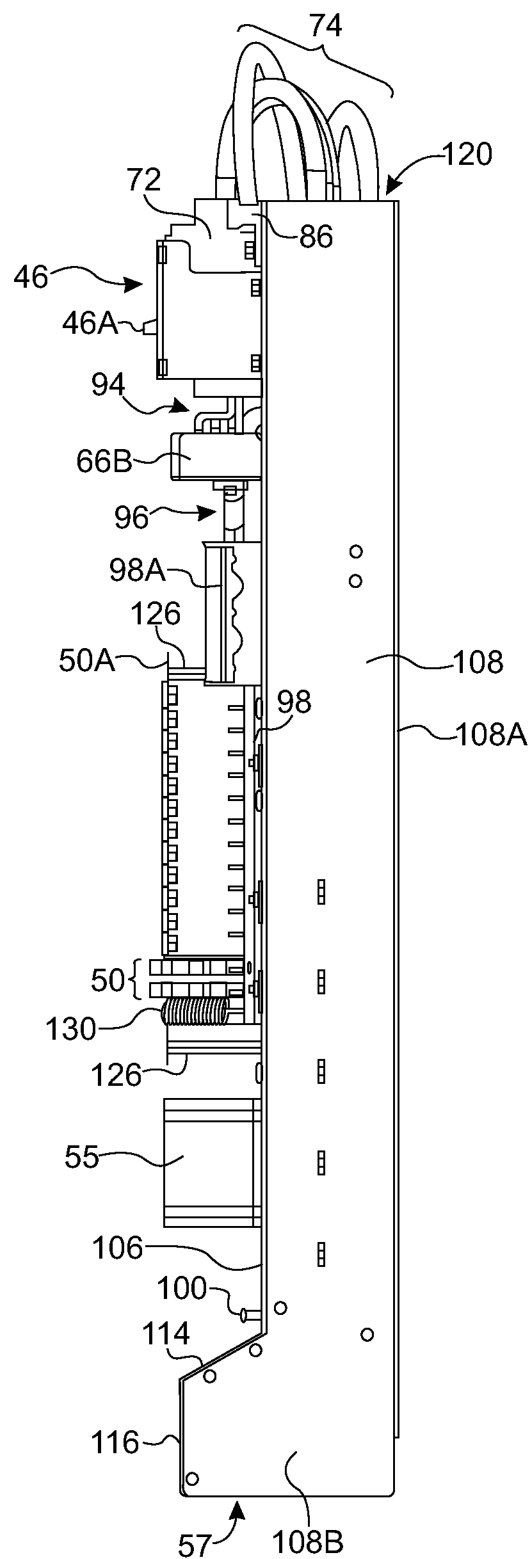
FIG. 12 is a side elevation view showing the service assembly of FIG. 9.
Figure 13:
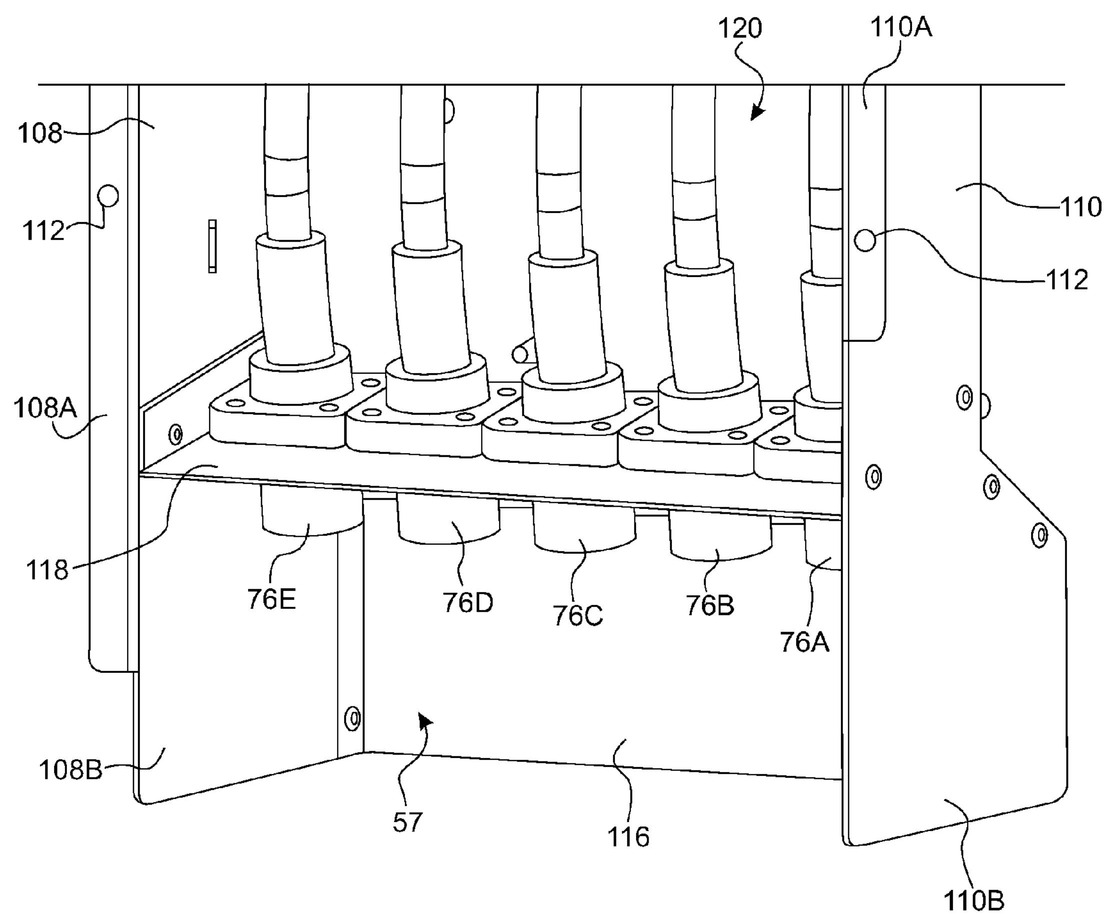
FIG. 13 is partial perspective view showing a lower rear portion of the service assembly of FIG. 9.

As can be seen in FIGS. 9, 11 and 12, the side sections 108 and 110 are sized to space the mounting platform 106 from the back 20 of the enclosure housing 4 (which is flush with the flanges 108B and 110B). The mounting platform 106 is spaced by an amount that is sufficient to provide an alternate power source wireway 120 that carries the alternate power source wiring 74 within a protected compartment. As also shown in FIG. 11, the alternate source wiring 74 can be supported in the wireway 118 by a wire support bracket 122. The support bracket 122 mounts to the side sections 108 and 110 and spans the wireway space therebetween. Several pairs of slots 122A may be formed in the wire support bracket 122 in order mount cable ties 122B that wrap around each of the alternate power source wires 74.

Additional items of interest that are shown in FIGS. 9-12 include the previously mentioned barrier plate stub 66B disposed between the primary service panel 48 and the distribution panel 52. As discussed, the barrier plate stub 66B is part of the main barrier plate 66 that provides isolation between the primary service panel 48 and the distribution panel 52. As should be apparent from FIG. 9, the barrier plate stub 66B includes apertures for routing elements of the bus network 94/96 that interconnects the primary service panel 48 and the distribution panel 52. Further items not previously mentioned in connection with FIGS. 9-12 include (1) a channel member 124 that may be mounted to the top of side section 110 and used to support the neutral connector block 86, (2) standoff fasteners 126 for mounting the circuit breaker face plate 50A to the bus bar framework 98, (3) insulative dividers 128 on the bus bar framework 98 that isolate the lower bus bars 96A, 96B and 96C from each other, and (4) a coil spring 130 that provides a spring load on the lower dead front door 44 when it is latched shut and which facilitates opening when the door is unlatched.

As indicated above, the panelboard assembly 102 allows nearly the entire panelboard 2 to be assembled, tested and installed at a manufacturer's facility, with very little field installation being required to place the panelboard in service. These operations may be performed in the following manner. First, the panelboard assembly 102 is preferably pre-assembled before it is installed in the enclosure housing 4. Pre-assembly includes mounting the components of the primary service panel 48, the distribution panel 52, the alternate power source connector array 76, the alternate power source wiring 74 and the service transfer switch unit 46 to the assembly frame 104. If desired, the panelboard assembly 102 may be tested at this point to verify the integrity of its components and wiring connections. The panelboard assembly 102 may now be installed in the enclosure housing 4, as by fastening the flanges 108A of the base assembly frame 104 to the back 8 of the enclosure housing. This completes the panelboard 102, such that is now ready for transport to an installation location. At the location, the panelboard 102 is installed by mounting it to an appropriate support structure. Electrical connections may now be made. This includes connecting the load circuit wiring to the distribution panel. The main power source wiring will also be routed through the main power source wireway and connected to the main power breaker 72.

Figure 14:
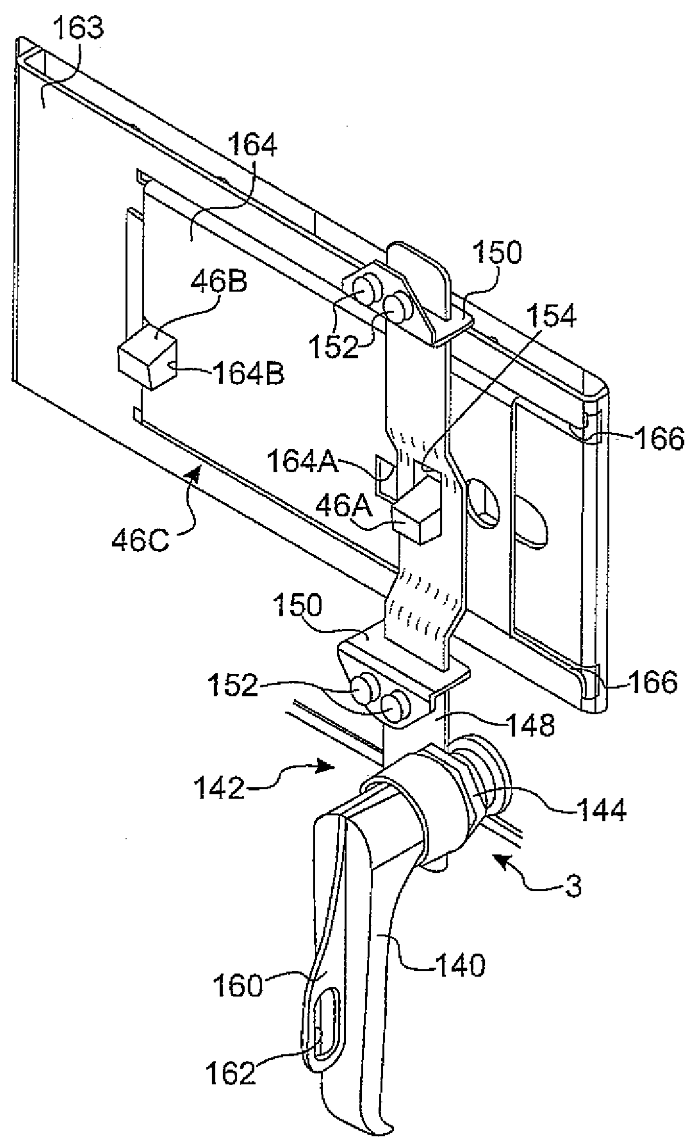
FIG. 14 is an enlarged perspective view showing a power cutoff switch mechanism of the panelboard enclosure of FIG. 1.
Figure 15:
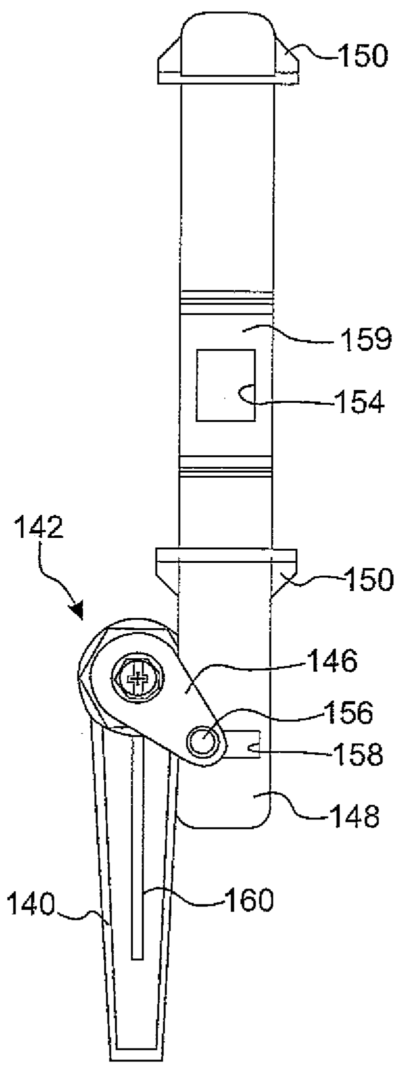
FIG. 15 is a rear elevation view showing the power cutoff switch mechanism of FIG. 14.
Figure 16:
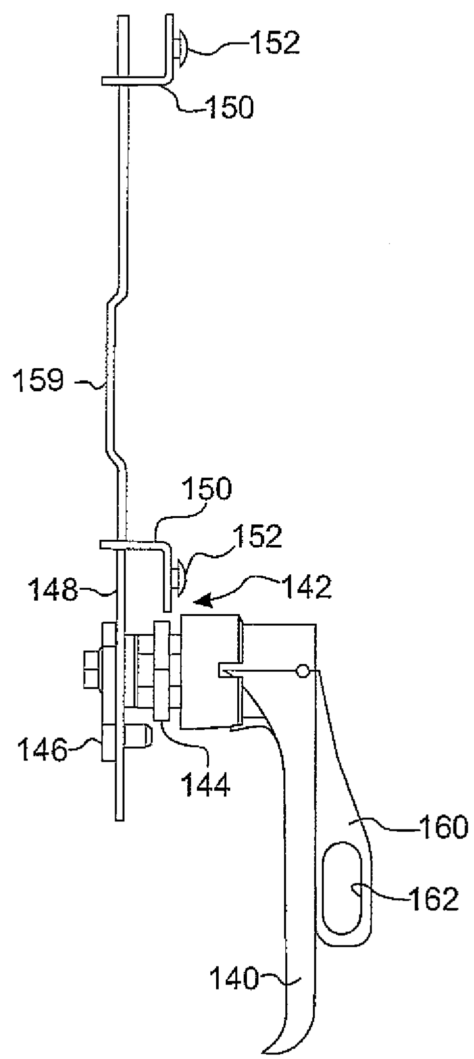
FIG. 16 is a side elevation view showing the power cutoff switch mechanism of FIG. 14.

Turning now to FIGS. 14-16, an example embodiment of the power cutoff switch 3 first mentioned in connection with FIG. 1 will be described. As previously discussed, the power cutoff switch 3 is operable from outside the service entrance door 22 (not shown in FIGS. 14-16) to mechanically engage and deactivate the main power breaker toggle switch 46A and cutoff main power without having to open the service entrance door. In the embodiment of FIGS. 14-16, the power cutoff switch 3 includes a handle 140 that extends from the outer end of a rotatable hub assembly 142. A central portion of the hub assembly 142 extends through an aperture (not shown) in the service entrance door 22 and is secured thereto using a conventional backing nut 144. The inner end of the hub assembly 142 mounts a crank arm 146. The free end of the crank arm 146 is coupled to a slidable switch bar 148. The switch bar 148 is slidably mounted to the inside surface of the service entrance door 22 using a pair of upper and lower mounting brackets 150. The mounting brackets 150 can be riveted or otherwise attached to the entrance door 22 using rivets 152 or other types of fasteners. Each mounting bracket 150 is formed with a slot in which the switch bar 148 is slidably disposed.

The switch bar 148 includes a central slot aperture 154 that directly engages the main power breaker toggle switch 46A for manipulation between a power-on state and a power-off state as the handle 140, the hub assembly 142 and the crank arm 146 are rotated. In order to effect this motion, the hub assembly 142 is off-center from the switch bar 148 and the crank arm 146 is configured with a cam follower pin 156 that operatively engages a cam slot 158 (providing a cam surface) on the switch bar. This arrangement serves to linearly drive the switch bar 148 when the handle 140, the hub assembly 142 and the crank arm 144 are rotated. As shown in FIG. 16, a section 159 of the switch bar 148 that carries the aperture 154 may be rearwardly offset from the remainder of the switch bar. This positions the aperture 154 at the base of the main power breaker toggle switch 46A to help ensure that the switch bar 148 will not become decoupled therefrom.

If desired, the handle 140 may be provided with a conventional lock clasp 160 for securing the handle in a power-on position. The lock clasp 160 is pivotally mounted to the handle 140 so as to be movable between a locking position wherein the handle 140 is locked against rotation and an unlocking position wherein the handle is free to rotate. The locking position is shown in FIGS. 14-16. In this position, the bottom lock clasp 160 is pivoted outwardly from the handle 140. Pivoting the bottom of the lock clasp 160 into the handle 140 places the lock clasp in the unlocking position. As can be seen in FIGS. 14 and 16, the lock clasp 160 includes a small opening 162 that is capable of receiving a padlock when the lock clasp is in its locking position. The padlock prevents the lock clasp 160 from being pushed to the unlocking position. In the event of an emergency requiring power shutoff, the padlock can be removed in any required manner (including by cutting it off with lock cutters) in order to allow the power transfer switch 3 to be operated.

Before leaving FIGS. 14-16, it should be mentioned that FIG. 14 shows additional details of the interlock mechanism 46 of the service transfer switch unit 46. In particular, the interlock mechanism 46 includes a base plate 163 that mounts over the main power breaker 72 and the alternate power breaker 84 (not shown in FIG. 14). The interlock mechanism 46 further includes a slide member 164 that is slidably mounted in a pair of slots 166 formed in the base plate 163. The slide member 164 is formed with cutouts 164A and 164B that respectively engage the main power breaker toggle switch 46A and the alternate power breaker toggle switch 46B. The right-hand cutout 164A is formed as a reverse "L" and the left-hand cutout 164B is formed as a notch. When the slide member 164 is in the left-hand position shown in FIG. 14, the main power breaker toggle switch 46A is free to toggle up (power on) and down (power off) within the vertical portion of the right-hand cutout 164A. This is the position that slide member 164 would normally be in when the enclosure 2 is receiving main power.

When the main power beaker toggle switch 46A is toggled up and the main power is on, the slide member 164 cannot be slid to the right and the alternate power breaker toggle switch 46B cannot be operated due to being captured by the left-hand cutout 164B. In the event that power from an alternate power is required, the main power breaker toggle switch 46A must first be toggled down to shut off the main power. Only then may the slide member 164 be slid to the right in order to operate the alternate power breaker toggle switch 46B. In this position, the main power breaker toggle switch 46A is captured by the lower portion of the right-hand cutout 164A, thus preventing the main power from being turned on.

Figure 17:
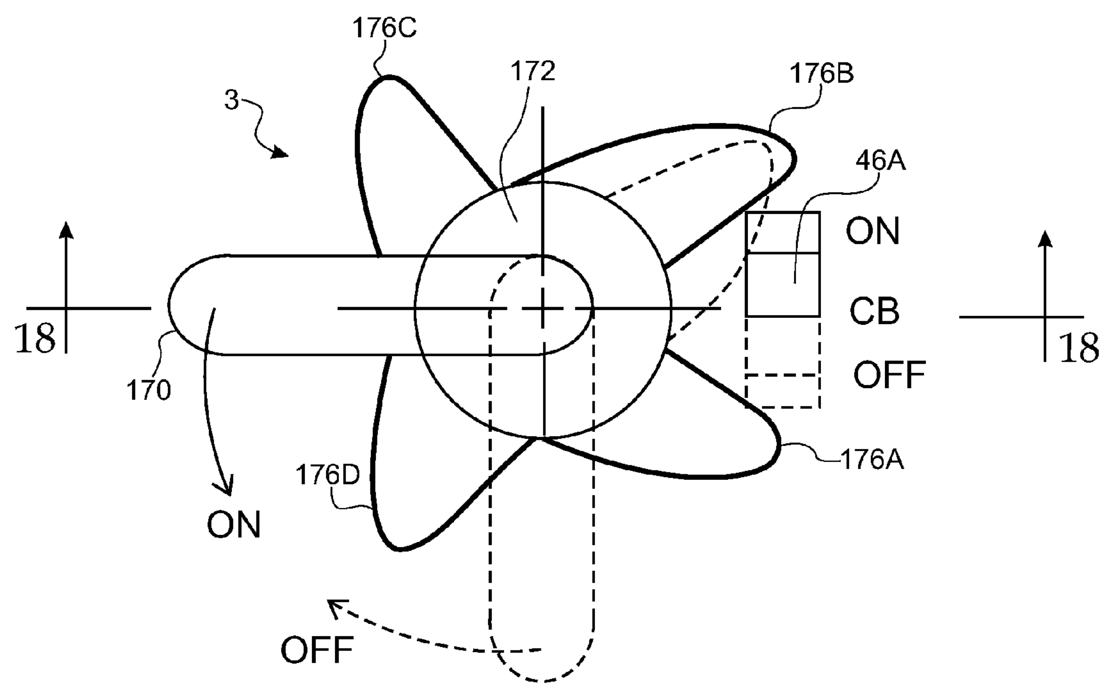
FIG. 17 is a plan view showing an alternate embodiment of a power cutoff switch that may be used in the panelboard enclosure of FIG. 1.
Figure 18:
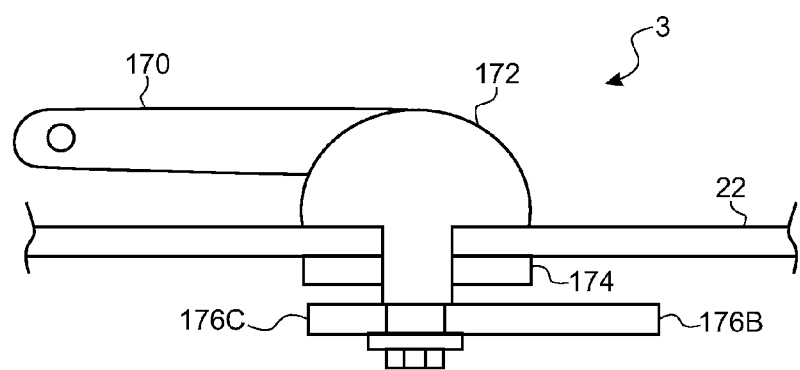
FIG. 18 is a cross-sectional view taken along line 18-18 in FIG. 17.

Turning now to FIGS. 17-18, an alternate embodiment of the power cutoff switch 3 is shown. In this embodiment, the power cutoff switch 3 includes a handle 170 that extends from the outer end of a rotatable hub assembly 172. A central portion of the hub assembly 172 extends through an aperture in the service entrance door 22 and is secured thereto using a conventional backing nut 174. The inner end of the hub assembly 172 mounts a pair of arm members 176A and 176B. The power cutoff switch 3 is located on the service entrance door so that free ends of arm members 176A and 176B can directly engage the main power breaker toggle switch 46A as the handle 170 is rotated. The arm members 176A and 176B respectively extend below and above the main power breaker toggle switch 46A. The lower arm member 176A is operative to power on the main power breaker power toggle switch 46A when the handle 170 is rotated to the downward position shown in FIG. 17. The upper arm member 176B is operative to power off the main power breaker toggle switch 46A when the handle is rotated to the leftward position shown in FIG. 17.

As further shown in FIG. 17, additional arm members, such as arm members 176C and 176D may be mounted to the hub assembly 172. This allows the handle 170 to be in virtually any position when the service entrance door 22 is closed, so long as one of the arm members 176A-D is not directly over the main power breaker toggle switch 46A. Turning the handle 170 counterclockwise will always cause one of the arm member 176A-D to turn on the main power breaker toggle switch 46A, while turning the handle 170 clockwise will have the opposite effect. It will also be appreciated that the same result could be achieved with only a single arm member, albeit the handle 170 may need to be turned nearly 360 degrees to activate the main power breaker toggle switch 46A, depending on the handle's position when the service entrance door 22 is closed.

Figure 19:
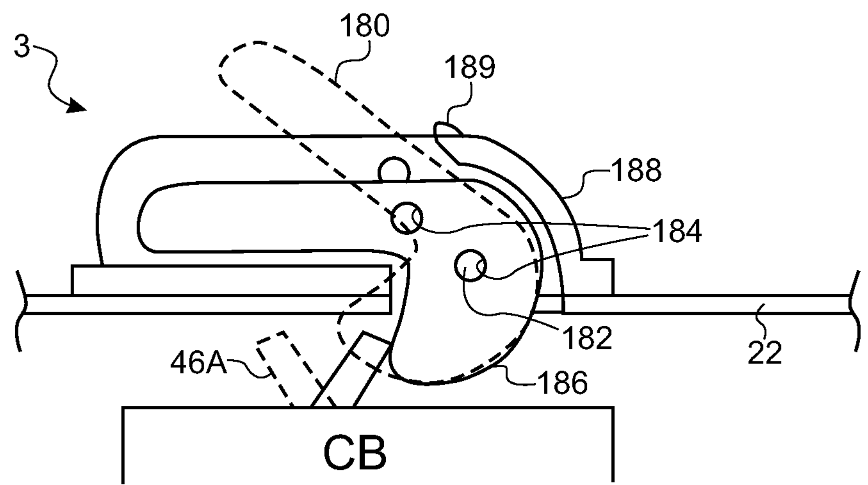
FIG. 19 is a plan view showing another alternate embodiment of a power cutoff switch that may be used in the panelboard enclosure of FIG. 1.

Turning now to FIG. 19, another alternate embodiment of the power cutoff switch 3 is shown. In this embodiment, the power cutoff switch 3 includes a handle 180 that is pivotally mounted to an outer side of the service entrance door 22. The handle 180 can be pivotally mounted on a pivot pin 182 that extends through a pin-receiving aperture 184 formed at a selected location on the handle. Note that several apertures 184 may be provided for adjustment purposes. The handle 180 further includes a cam lobe 186 that extends through the service entrance door 22. The cam lobe 186 is operative to power off the main power breaker toggle switch 46A as the handle 180 is pivoted from a home position in which it is generally parallel to the service entrance door and an open position wherein the handle has been pulled outwardly. Proper positioning of the cam lobe 186 relative to the main power breaker toggle switch 46A can be obtained by selecting the appropriate handle aperture 184 for receiving the pivot pin 182. Note that this embodiment of the power shutoff switch 3 only allows the main power breaker toggle switch 46A to be turned off. To restore main power, the main power breaker toggle switch 46A must be manually switched and the handle 180 must be placed in its home position before closing the service entrance door 22. If desired, a protective cover 188 may be mounted on the service entrance door 22 to protect the handle and pivot components from the elements. A drip lip 189 will help divert water from this area.

Figure 20:
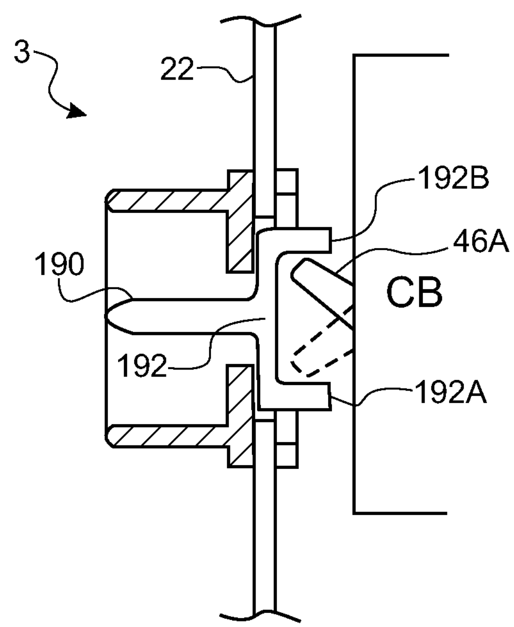
FIG. 20 is a plan view showing a further alternate embodiment of a power cutoff switch that may be used in the panelboard enclosure of FIG. 1.

Turning now to FIG. 20, another alternate embodiment of the power cutoff switch 3 is shown. In this embodiment, the power cutoff switch 3 includes a slidable handle 190 that is mounted on an outer side of the service entrance door 22. The handle 190 includes a fork 192 that extends through the service entrance door 22 and is operative to selectively power on and power off the main power breaker toggle switch 46A as the handle is slid between upper and lower positions. In particular, a lower prong 192A of the handle fork 192 is operative to power on the main power breaker power toggle switch 46A when the handle 190 is slid upwardly in FIG. 20. An upper prong 192B of the handle fork 192 is operative to power off the main power breaker power toggle switch 46A when the handle 190 is slid downwardly in FIG. 20. If only a power-off feature is required, the lower prong 172A would not be required.

Using any of the power cutoff switch embodiments disclosed above, the panelboard 2 may be operated to arm the power cutoff switch 3 in the following manner. First, the service entrance door 22 is opened to gain access to the interior equipment chamber 20. If the alternate power breaker toggle switch 46B is in the power-on position, it should be turned off. The interlock mechanism 46C may be manipulated by sliding it to the left to allow actuation of the main power breaker toggle switch 46A. The main power breaker toggle switch 46 may now be actuated to its power-on position to apply power from the main power source to the distribution panel 52. Before the service entrance door 22 is closed, the power cutoff switch 3 should be placed in its power-on position. The service entrance door 22 may now be closed so that the power cutoff switch 3 engages the main power breaker toggle switch 46A. The power cutoff switch 3 will now be armed and positioned to deactivate the main power breaker toggle switch 46A. In case of an emergency or other event requiring a main power cutoff, the power cutoff switch 3 may be actuated to deactivate the main power breaker toggle switch 46A and cutoff main power to the distribution panel 52, all while the service entrance door 22 remains closed.

Accordingly, an electrical panelboard enclosure has been disclosed. Although various embodiments of the invention have been described, it should be apparent that many variations and alternative embodiments could be implemented in accordance with the invention. For example, although various embodiments of the power cutoff switch 3 have been disclosed, it will be appreciated that other cutoff switch designs could also be implemented based on the teachings herein. It is understood, therefore, that the invention is not to be in any way limited except in accordance with the spirit of the appended claims and their equivalents.

What is claimed is:

1. An electrical panelboard enclosure, comprising:

an enclosure housing having a front, a back, first and second sides, a top, a bottom, an opening in said front, and an interior equipment chamber accessible via said front opening;

a service entrance door pivotally mounted on said housing and positionable between a closed position wherein said front opening is covered and an open position wherein said front opening is exposed;

a primary service panel in said equipment chamber configured to receive power from a main power source and an alternate power source;

a main power source wireway in said equipment chamber arranged for routing main power source wiring to deliver main power from said main power source to said primary service panel;

an alternate power source connector array in said equipment chamber accessible from outside said enclosure housing and configured to detachably connect to alternate power source cables;

an alternate power source wireway in said equipment chamber arranged for routing alternate power source wiring;

alternate power source wiring disposed in said alternate power source wireway and interconnecting said alternate power source connector array and said primary service panel;

a distribution panel in said equipment chamber operable to selectively receive said main or alternate power from said primary service panel and distribute said power to one or more subsidiary load circuits;

a service transfer switch unit associated with said primary service panel, said service transfer switch unit being operable to selectively deliver said main power and said alternate power to said distribution panel;

a main power breaker in said service transfer switch unit having a main power breaker toggle switch operable to selectively activate and deactivate said main power to said distribution panel;

an alternate power breaker in said service transfer switch unit having an alternate power breaker toggle switch operable to selectively activate and deactivate said alternate power to said distribution panel;

an interlock in said service transfer switch operable to prevent simultaneous activation or deactivation of both said main power breaker toggle switch and said alternate power breaker toggle switch;

a power cutoff switch mounted entirely on said service entrance door and operable from outside said service entrance door to mechanically engage and deactivate said main power breaker toggle switch and cutoff said main power without opening said service entrance door;

said power cutoff switch comprising a rotatable handle mounted on an outer side of said service entrance door;

said handle being mounted on a rotatable hub that extends through said service entrance door;

said rotatable hub mounting a rotatable arm member on an inner side of said service entrance door;

said arm member being coupled to a slidable switch bar that operatively engages said main power breaker toggle switch for manipulation between a power-on state and a power-off state as said handle, said rotatable hub and said rotatable arm member are rotated; and said rotatable hub being off-center from said switch bar and said arm member being configured with a cam follower pin that operatively engages a cam surface on said switch bar to linearly drive said switch bar when said handle is rotated.

2. The panelboard enclosure of claim 1, wherein said rotatable handle includes a lock clasp that is movable between a locking position wherein said handle is locked against rotation and an unlocking position wherein said handle is free to rotate, said lock clasp being configured to receive a padlock when in said locking position.

3. A method of using the panelboard enclosure of claim 1, comprising:

opening said service entrance door;

manipulating said interlock to allow activation of said main power breaker toggle switch;

actuating said main power breaker toggle switch to a power-on position to apply power from said main power source to said distribution panel;

placing said power cutoff switch in a power-on position; and closing said service entrance door so that said power cutoff switch engages said main power breaker toggle switch to allow said power cutoff switch to deactivate said main power breaker toggle switch.

4. The method of claim 3, further including actuating said power cutoff switch to deactivate said main power breaker toggle switch and cutoff said main power to said distribution panel while said service entrance door is closed.

5. A method of using the panelboard enclosure of claim 1, comprising:

determining that power from said main power source has been interrupted;

connecting individual cables of said alternate power source cables to individual connectors of said alternate power source connector array;

opening said service entrance door;

actuating said main power breaker toggle switch to a power off position;

manipulating said interlock to allow actuation of said alternate power breaker toggle switch;

actuating said alternate power breaker toggle switch to a power-on position to apply power from said alternate power source to said distribution panel;

placing said power cutoff switch in a power-off position; and closing said service entrance door so that said power cutoff switch engages said main power breaker toggle switch to allow said service entrance door to close.

6. An electrical panelboard enclosure, comprising:

an enclosure housing having a front, a back, first and second sides, a top, a bottom and an interior equipment chamber;

a primary service panel in said equipment chamber configured to receive power from a main power source and an alternate power source;

a main power source wireway in said equipment chamber arranged for routing main power source wiring to deliver main power from said main power source to said primary service panel;

an alternate power source connector array in said equipment chamber accessible from outside said enclosure housing and configured to detachably connect to alternate power source cables;

an alternate power source wireway in said equipment chamber arranged for routing alternate power source wiring;

alternate power source wiring disposed in said alternate power source wireway and interconnecting said alternate power source connector array and said primary service panel;

a distribution panel in said equipment chamber operable to selectively receive said main or alternate power from said primary service panel and distribute said power to one or more subsidiary load circuits;

a service transfer switch unit associated with said primary service panel, said service transfer switch unit being operable to selectively deliver said main power and said alternate power to said distribution panel;

a main power breaker in said service transfer switch unit having a main power breaker toggle switch operable to selectively activate and deactivate said main power to said distribution panel;

an alternate power breaker in said service transfer switch unit having an alternate power breaker toggle switch operable to selectively activate and deactivate said alternate power to said distribution panel;

an interlock in said service transfer switch operable to prevent simultaneous activation or deactivation of both said main power breaker toggle switch and said alternate power breaker toggle switch;

a power cutoff switch mounted entirely on said enclosure housing and operable from outside said enclosure to mechanically engage and deactivate said main power breaker toggle switch and cutoff said main power; and said power cutoff switch being selected from the group consisting of:

(1) a rotatable handle mechanism comprising a rotatable handle mounted on an outer side of said enclosure housing, said handle being mounted on a rotatable hub that extends through said enclosure housing, said rotatable hub mounting a rotatable arm member on an inner side of said enclosure housing, said arm member being coupled to a slidable switch bar that operatively engages said main power breaker toggle switch for manipulation between a power-on state and a power-off state as said handle, said rotatable hub and said rotatable arm member are rotated, and said rotatable hub being off-center from said switch bar, and said arm member being configured with a cam follower pin that operatively engages a cam surface on said switch bar to linearly drive said switch bar when said handle is rotated;

(2) a rotatable handle mechanism a rotatable handle mounted on an outer side of said enclosure housing, said handle being mounted on a rotatable hub that extends through said service entrance door, said rotatable hub mounting at least two rotatable arm members on an inner side of said enclosure housing, said rotatable arm members directly engaging said main power breaker toggle switch depending on a rotational position of said handle;

(3) a pivotable handle mechanism, said pivotable handle mechanism including a pivotable handle and a cam lobe that operatively engages said main power breaker toggle switch as said handle is pivoted; and (4) a slidable handle mechanism, said slidable handle mechanism includes a slidable handle and a fork hub that operatively engages said main power breaker toggle switch as said handle is slid between first and second positions.

7. The panelboard enclosure of claim 6, further including a door providing access to said interior equipment chamber, and wherein said power cutoff switch is mounted on said door.

8. The panelboard enclosure of claim 7, wherein said door is a service entrance door.

9. An electrical panelboard enclosure, comprising:

an enclosure housing having a front, a back, first and second sides, a top, a bottom, an opening in said front, and an interior equipment chamber accessible via said front opening;

a service entrance door pivotally mounted on said housing and positionable between a closed position wherein said front opening is covered and an open position wherein said front opening is exposed;

a primary service panel in said equipment chamber configured to receive power from a main power source and an alternate power source;

a main power source wireway in said equipment chamber arranged for routing main power source wiring to deliver main power from said main power source to said primary service panel;

an alternate power source connector array in said equipment chamber accessible from outside said enclosure housing and configured to detachably connect to alternate power source cables;

an alternate power source wireway in said equipment chamber arranged for routing alternate power source wiring;

alternate power source wiring disposed in said alternate power source wireway and interconnecting said alternate power source connector array and said primary service panel;

a distribution panel in said equipment chamber operable to selectively receive said main or alternate power from said primary service panel and distribute said power to one or more subsidiary load circuits;

a service transfer switch unit associated with said primary service panel, said service transfer switch unit being operable to selectively deliver said main power and said alternate power to said distribution panel;

a main power breaker in said service transfer switch unit having a main power breaker toggle switch operable to selectively activate and deactivate said main power to said distribution panel;

an alternate power breaker in said service transfer switch unit having an alternate power breaker toggle switch operable to selectively activate and deactivate said alternate power to said distribution panel;

an interlock in said service transfer switch operable to prevent simultaneous activation or deactivation of both said main power breaker toggle switch and said alternate power breaker toggle switch;

a power cutoff switch mounted entirely on said service entrance door and operable from outside said service entrance door to mechanically engage and deactivate said main power breaker toggle switch and cutoff said main power without opening said service entrance door; and said power cutoff switch being selected from the group consisting of:

(1) a rotatable handle mechanism having a rotatable handle mounted on a rotatable hub, a rotatable arm on said hub, and a slidable switch bar driven by said arm and operatively engaging said main power breaker toggle switch, for manipulation between a power-on state and a power-off state as said handle, said rotatable hub and said rotatable arm member are rotated, and said rotatable hub being off-center from said switch bar, and said arm member being configured with a cam follower pin that operatively engages a cam surface on said switch bar to linearly drive said switch bar when said handle is rotated;

(2) a rotatable handle mechanism having a rotatable handle mounted on a rotatable hub and at least two rotatable arms on said hub operatively engaging said main power breaker toggle switch;

(3) a pivotable handle mechanism having a pivotable handle and a cam lobe that operatively engages said main power breaker toggle switch as said handle is pivoted; and (4) a slidable handle mechanism having a slidable handle and a fork hub that operatively engages said main power breaker toggle switch as said handle is slid slid between first and second positions.

* * * * *